(12) United States Patent
Jha et al.

(10) Patent No.: US 11,551,445 B2
(45) Date of Patent: Jan. 10, 2023

(54) HEATMAP VISUALIZATION OF OBJECT DETECTIONS

(71) Applicant: SONY CORPORATION, Tokyo (JP)

(72) Inventors: Abhishake Jha, Bangalore (IN); Shehnaz Mohamed, Bangalore (IN)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 16/993,676

(22) Filed: Aug. 14, 2020

(65) Prior Publication Data

US 2022/0051020 A1     Feb. 17, 2022

(51) Int. Cl.
*G06V 20/20* (2022.01)
*G06V 10/25* (2022.01)
*G06N 3/04* (2006.01)
*G06T 11/20* (2006.01)

(52) U.S. Cl.
CPC ............... *G06V 20/20* (2022.01); *G06N 3/04* (2013.01); *G06T 11/20* (2013.01); *G06V 10/25* (2022.01); *G06T 2210/12* (2013.01)

(58) Field of Classification Search
CPC ........ G06V 20/20; G06V 10/25; G06V 20/10; G06V 20/52; G06N 3/04; G06T 11/20; G06T 2210/12; G06K 9/6253; G06K 9/6271
See application file for complete search history.

(56) References Cited

U.S. PATENT DOCUMENTS 10,558,891 B2   2/2020   Wang et al.
11,195,024 B1*  12/2021  Fan .................... G06V 20/46
2018/0341872 A1 11/2018  Wang et al.
2018/0357518 A1* 12/2018 Sekii .................... G06T 7/187
2019/0251401 A1*  8/2019 Shechtman ........... G06V 20/20
2019/0278994 A1*  9/2019 Bumpas ................. G06N 3/08
(Continued)

OTHER PUBLICATIONS

Lin, et al., "A Heat-Map-Based Algorithm for Recognizing Group Activities in Videos", Transactions on Circuits and Systems for Video Technology, IEEE, vol. 23, No. 11, Nov. 2013, pp. 1980-1992.
(Continued)

*Primary Examiner* — Jianxun Yang
(74) *Attorney, Agent, or Firm* — Chip Law Group

(57) ABSTRACT

An electronic apparatus and method for heatmap visualization of object detections is provided. The electronic apparatus inputs an image frame including an object of interest to Deep Neural Network (DNN) model and extracts an object detection result associated with the object of interest as output of the DNN model for the input image frame. The object detection result includes bounding box coordinates for the object of interest. The electronic apparatus segments the input image frame into a plurality of image portions based on the bounding box coordinates and determines, for each of the plurality of image portions, a weight value indicative of a likelihood that a corresponding image portion belongs to the object of interest. The electronic apparatus generates, based on the determined weight value, a visualization frame which includes heatmap visualization of a region that is included in the image frame and is bounded by the bounding box coordinates.

21 Claims, 16 Drawing Sheets

(56) References Cited

U.S. PATENT DOCUMENTS

2020/0236343 A1* 7/2020 Holzer .................. G01C 21/32

OTHER PUBLICATIONS

Branko Blagojevic, "Offline Object Detection and Tracking on a Raspberry Pi", MI-Everything, May 9, 2018, 11 pages.
"Image Recognition with Keras: Convolutional Neural Networks", Python and R Tutorials, Advanced Modeling in Python, Datascienceplus.com, Feb. 17, 2019, 02 pages.
"Image Processing", Lib C++ Libraries, Aug. 7, 2020, 39 pages.
Adrian Rosebrock, "Label smoothing with Keras, TensorFlow, and Deep Learning", Pyimagesearch.com, Dec. 30, 2019, 32 pages.
Adrian Rosebrock, "Pedestrian Detection OpenCV", Pyimagesearch.com, Nov. 9, 2015, 20 pages.
"Motion Heatmap", Github, python CV Samples, 2020, 03 pages.
International Search Report of PCT Application No. PCT/IB2021/057411, dated Jan. 12, 2022, 15 pages of ISRWO.
Gidaris, et al., "LocNet: Improving Localization Accuracy for Object Detection", Institute of Electrical and Electronics Engineers, Conference on Computer Vision And Pattern Recognition (CVPR), XP033021256, Jun. 27, 2016, pp. 789-798.
Wu, et al., "Object detection based on RGC mask R-CNN", Institution of Engineering and Technology, Image Processing, Institution of Engineering and Technology, UK, vol. 14, No. 8, XP006090670, Jun. 19, 2020, pp. 1502-1508.
Xu, et al., "Deep GrabCut for Object Selection", Computer Vision and Pattern Recognition, XP080773747, Jul. 14, 2017, 12 pages.
Sultana, et al., "Evolution of Image Segmentation using Deep Convolutional Neural Network: A Survey", Knowledge-Based Systems, Elsevier, Amsterdam, NL, vol. 201, XP086179027, May 29, 2020, 25 pages.
Ren, et al., "Faster R-CNN: Towards Real-Time Object Detection with Region Proposal Networks", IEEE, Transactions on Pattern Analysis and Machine Intelligence, vol. 39, No. 6, XP055847873, Jun. 6, 2016, pp. 1137-1149.

* cited by examiner

HEATMAP VISUALIZATION OF OBJECT DETECTIONS

REFERENCE

None.

FIELD

Various embodiments of the disclosure relate to computer vision, object detection, and explainable artificial intelligence (XAI). More specifically, various embodiments of the disclosure relate to an electronic apparatus and method for heatmap visualization of objects detections from images.

BACKGROUND

Advancements in computer vision and explainable artificial intelligence have led to development of various visualization techniques which render results of deep learning models in a way that such rendered results can be understood by human experts. Conventionally, deep learning models, as object classifiers, produce a classification result that merely selects a class label for an object in input images. In some cases, techniques relying on such classification results may generate inaccurate visualization of focus regions meant to include the classified object.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for heatmap visualization of object detections from images is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
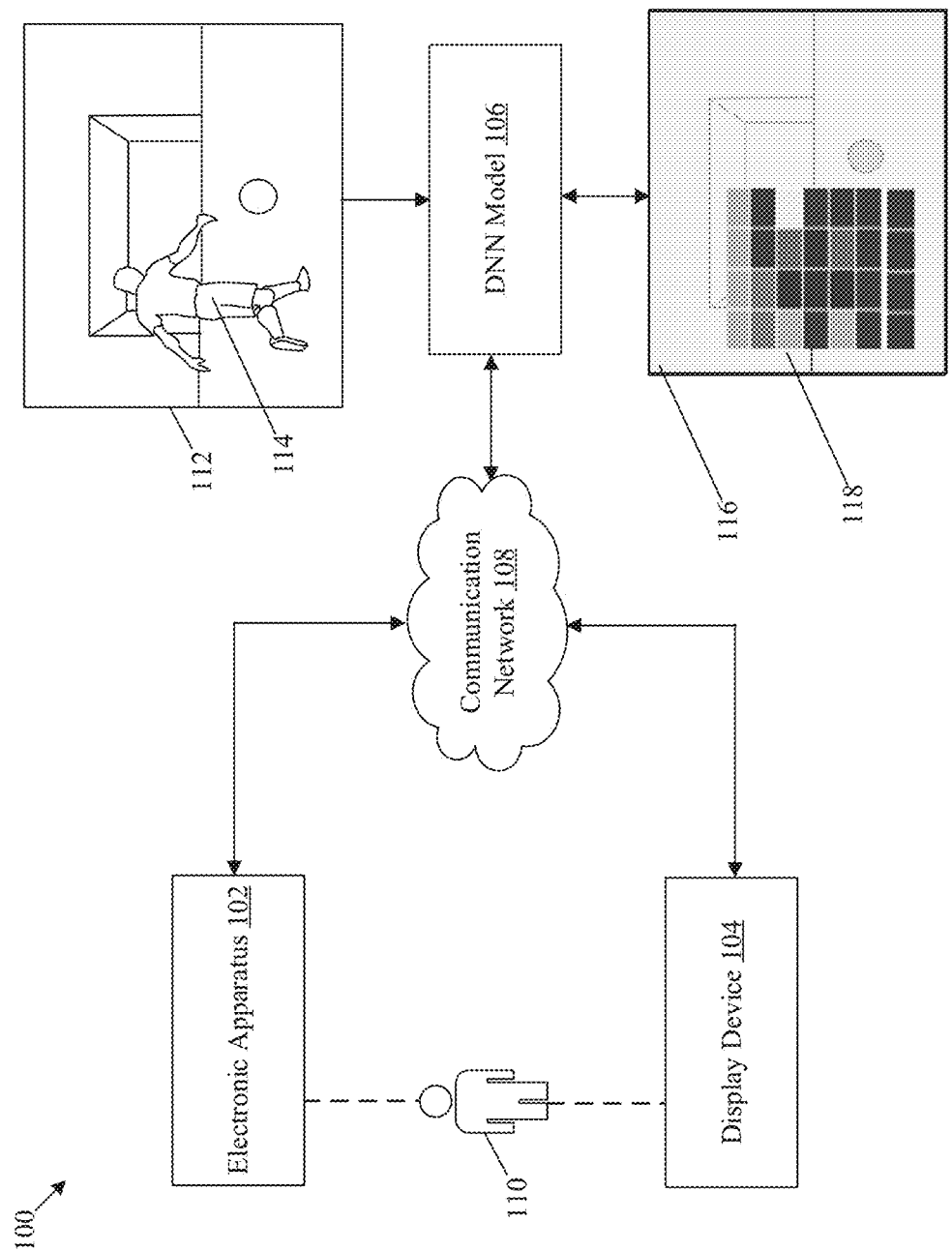
FIG. 1 is a block diagram that illustrates an exemplary network environment for heatmap visualization of object detections, in accordance with an embodiment of the disclosure.

The following described implementations may be found in the disclosed electronic apparatus and method for heatmap visualization of object detections. Exemplary aspects of the disclosure provide an electronic apparatus which implements a Deep Neural Network (DNN) model for detection of single or multiple objects in single static images (as well as in a video feed) and under various time-varying and static conditions. Such conditions may include, for example, one object partially or fully overlapping or occluding another object, an object missing in one or more images, two separate objects lumped together in successive frames, a smaller object is included within a larger object, and the like.

As part of an eXplainable Artificial Intelligence (XAI) workflow, the electronic apparatus further implements a visualization tool which outputs a heatmap visualization of single or multiple object detections in single static images or in a video feed. The heatmap visualization may indicate each segment of image with a color intensity which depends on a weightage or a contribution of respective segment in an object detection result of the DNN model. Such visualization may help developers or end users to view results of DNN model and may help them to derive meaningful insights from images. Also, end-users or developers may be able to use suitable visual metrics to evaluate the accuracy of the heatmap visualization and to improve the detection performance of the DNN model.

In conventional methods, heatmap visualizations are coarse and generalized and they may not handle multiple objects. Also, a knowledge expert is required to understand the heatmap. The expert visually analyses the heatmap and provides deductions as feedback to the application. This may create a time lag.

The disclosed electronic apparatus receives input data from sensing/imaging device and produces heatmap visualizations and metric data to output an inference result for object(s) of interest. For every user selection (object(s) of interest), heatmap may be generated for detected object(s) (single/multiple). The present disclosure provides heatmap visualizations that are finer and are generated with respect to each bounding box, makes them adaptable to multiple object detection. A knowledge expert may not be required to understand the heatmap visualization. The disclosed electronic apparatus may be configured to generate suitable inference results from the heatmap visualizations and may generate explanations to describe the inference results.

The heatmap visualizations may be used for visual analytics during auditing of an application to understand more on input data. The heatmap visualization along with visual metrics may be integrated to provide a better solution to the application. Also, using the heatmap visualization and metrics, inputs (such as input image frames or imaging devices acquiring such images) may be adjusted and then heatmap visualization may be regenerated without retraining the DNN model.

The disclosed electronic apparatus implements a method which may applicable to any object detection DNN model and may generate a heatmap visualization which may be more precise and granular as compared to the conventional methods. The method of the present disclosure may provide a metric to quantify the effect of a focus area of DNN model. While some conventional methods can be applied only for object detection, the method of the present disclosure may generate the heatmap visualization of detection of objects apart from classification of objects. The heatmap visualization may be of a focus area within a bounding box. The method of the present disclosure may also be applied on a video to generate a heatmap visualization of object(s) in the video based on tracking the motion and continuity of changes associated with object(s) in the video.

FIG. 1 is a block diagram that illustrates an exemplary network environment for heatmap visualization of object detections, in accordance with an embodiment of the disclosure. With reference to FIG. 1, there is shown a network environment 100. The network environment 100 may include an electronic apparatus 102, a display device 104, a Deep Neural Network (DNN) model 106 implemented on the electronic apparatus 102. The electronic apparatus 102 may be coupled to the display device 104 via a communication network 108. There is further shown a user 110 who may be associated with the electronic apparatus 102 and/or the display device 104. In FIG. 1, the electronic apparatus 102 and the display device 104 are shown as two separate devices; however, in some embodiments, the entire functionality of the display device 104 may be incorporated in the electronic apparatus 102, without a deviation from the scope of the disclosure.

The electronic apparatus 102 may include suitable logic, circuitry, code, and/or interfaces that may be configured to detect object(s) in input image frame(s) using the DNN model 106 and generate a visualization frame which includes a heatmap visualization of the detected object(s) based on object detection result(s) of the DNN model 106. Examples of the electronic apparatus 102 may include, but are not limited to, an image/video editing machine, a server, a laptop, a computer work-station, a mainframe machine, a gaming device, a Virtual Reality (VR)/Augmented Reality (AR)/Mixed Reality (MR) device, a smartphone, a mobile phone, and/or any consumer electronic (CE) device.

The display device 104 may include suitable logic, circuitry, and/or interfaces that may be configured to display the visualization frame, which includes the heatmap visualization of the detected object(s). In one embodiment, the display device 104 may be a touch-enabled device which may enable a user 110 to provide a user input via the display device 104. The display device 104 may include a display unit that may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display unit of the display device 104 may refer to a display screen of a head mounted device (HMD), a smart-glass device, a see-through display, a projection-based display, an electro-chromic display, or a transparent display.

The DNN model 106 may be an object detector model, which may be trained on an object detection task to detect objects in a single image frame or in a sequence of images frames of a video feed. The DNN model 106 may be defined by its hyper-parameters, for example, activation function(s), number of weights, cost function, regularization function, input size, number of layers, and the like. The DNN model 106 may be referred to as a computational network or a system of artificial neurons (also referred to as nodes). The nodes of the DNN model 106 may be arranged in a plurality of layers, as defined in a neural network topology of the DNN model 106. The plurality of layers of the DNN model 106 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the DNN model 106. Outputs of each hidden layer may be coupled to inputs of at least one node in other layers of the DNN model 106. Node(s) in the final layer may receive inputs from at least one hidden layer to output a result. The number of layers and the number of nodes in each layer may be determined from the hyper-parameters of the DNN model 106. Such hyper-parameters may be set before or while training the DNN model 106 on a training dataset.

Each node of the DNN model 106 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the DNN model 106. All or some of the nodes of the DNN model 106 may correspond to same or a different same mathematical function.

In training of the DNN model 106, one or more parameters of each node of the DNN model 106 may be updated based on whether an output of the final layer for a given input (from the training dataset) matches a correct result based on a loss function for the DNN model 106. The above process may be repeated for same or a different input till a minima of loss function is achieved, and a training error is minimized. Several methods for training are known in the art, for example, gradient descent, stochastic gradient descent, batch gradient descent, gradient boost, meta-heuristics, and the like.

In an embodiment, the DNN model 106 may include electronic data, which may be implemented as, for example, a software component of an application executable on the electronic apparatus 102. The DNN model 106 may rely on libraries, external scripts, or other logic/instructions for execution by a processing device, such as the electronic apparatus 102. The DNN model 106 may include computer-executable codes or routines to enable a computing device, such as the electronic apparatus 102 to perform one or more operations to detect objects in input images frames. Additionally, or alternatively, the DNN model 106 may be implemented using hardware including a processor, a microprocessor (e.g., to perform or control performance of one or more operations), a field-programmable gate array (FPGA), or an application-specific integrated circuit (ASIC). For example, an inference accelerator chip may be included in the electronic apparatus 102 to accelerate computations of the DNN model 106 for the object detection task. In some embodiments, the DNN model 106 may be implemented using a combination of both hardware and software.

Examples of the DNN model 106 may include, but are not limited to, an artificial neural network (ANN), a convolutional neural network (CNN), Regions with CNN (R-CNN), Fast R-CNN, Faster R-CNN, a You Only Look Once (YOLO) network, a Residual Neural Network (Res-Net), a Feature Pyramid Network (FPN), a Retina-Net, a Single Shot Detector (SSD), and/or a combination thereof.

The communication network 108 may include a communication medium through which the electronic apparatus 102 may communicate with the display device 104 and other devices which are omitted from disclosure for the sake of brevity. The communication network 108 may be one of a wired connection or a wireless connection. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic apparatus 102 may initiate an XAI workflow for detection of object(s) in image frame(s) and for heatmap visualization of regions which include the object(s) detected in such image frame(s). In an embodiment, the XAI workflow may be initiated based on a user input received via the display device 104.

As the XAI workflow is initiated, the electronic apparatus 102 may receive a first image frame (such as an image 112). The first image frame may be associated with a static scene with fixed foreground or background objects or a dynamic scene with one or more moving objects. The first image frame may include at least one object of interest. For example, the image 112 includes a soccer player 114 as an object of interest.

The electronic apparatus 102 may input the first image frame to the DNN model 106 that may be trained for an object detection task. The object detection task may be associated with single-class object detection or multi-class object detection. For example, if the object of interest is the soccer player 114, then the object detection task may be associated with a single-class object detection of the soccer player 114 (i.e. a human object). Otherwise, if there is more than one object of interest such as a soccer player 114 and a soccer ball, then the object detection task may be associated with a multi-class object detection of both the soccer player 114 and the soccer ball. In at least one embodiment, the DNN model 106 may be trained to detect multiple moving or static objects of same object class or a different object class in the first image frame.

The DNN model 106 may receive the input first image frame through an input layer of the DNN model 106. In some embodiments, the input first image frame may be resized to match a size of the input layer of the DNN model 106. For example, if the first image frame is a high definition image (i.e. 1280×720 pixels) but the size of the input layer is 416×416, then the electronic apparatus 102 may resize the first image frame to match the size of the input layer. Through an output layer of the DNN model 106, the DNN model 106 may output an object detection result associated with an object of interest detected in the input first image frame. For example, if the soccer player 114 in the image 112 is detected by the DNN model 106, then the object detection result may be a vector which includes an object score for the soccer player 114, bounding box coordinates of a bounding box predicted to include the soccer player 114, and class scores (or class probabilities) for the soccer player 114. The object score may specify a confidence (in terms of a probability value between 0 and 1) of the DNN model 106 in detection of the soccer player 114 in the image 112. A higher object score may denote a higher confidence level of the DNN model 106. In some embodiments, a threshold object score (e.g., 0.95) may be set to filter out object detection results in which the confidence of the detection is below the threshold object score. The class scores may include soft labels or hard labels to represent object classes which can be detected by the DNN model 106. The object of interest may belong to one of such classes. For example, if the DNN model 106 supports three classes such as a human object class, a car object class, and a cat object class, then the class score may be 1 (or a number close to 1) for the human object class and 0 (or close to 0) for each of the car object class and the cat object class.

In some embodiments, the DNN model 106 may employ a region or grid-based detection approach, whereby the DNN model 106 may divide the input first image frame into a plurality of grid cells and may perform a cell-wise search for the detection of the object of interest in one or more grid cells of the plurality of grid cells. In case multiple objects of interest overlap in common grid cells, anchor boxes may be specified to create a longer grid cell and multiple objects may be associated with such grid cells. In case multiple objects of interest are present in different grid cells, then the DNN model 106 may output an object detection result for each of the different grid cells associated with the multiple objects of interest. The electronic apparatus 102 may extract the object detection result associated with the object of interest as an output of the DNN model 106 for the first image frame.

For the heatmap visualization, the electronic apparatus 102 may segment the first image frame into a first plurality of image portions based on the bounding box coordinates. Thereafter, for each image portion of the first plurality of image portions, the electronic apparatus 102 may determine a weight value indicative of a likelihood that a corresponding image portion belongs to the object of interest. Details of the segmentation of the first image frame and the determination of weight values are described further, for example, in FIGS. 3A and 3B.

The electronic apparatus may generate a visualization frame based on the determined weight value for each image portion of the first plurality of image portions. The visualization frame may include the heatmap visualization of a region which is included in the input first image frame and is bounded by the bounding box coordinates, as described, for example, in FIGS. 3A and 3B. An example of a visualization frame 116 is shown to include a heatmap of a region 118 which includes the soccer player 114.

Each weight value may be mapped to a color intensity based on a color scheme of the heatmap visualization. For example, the color scheme may utilize a color palette, such as a rainbow palette or a warm-to-cool color scale. A higher weight value may be mapped to a warmer color (e.g., red, orange, yellow, or tints and shades thereof) which may fill a corresponding image portion of the visualization frame. Similarly, a lower weight value may be mapped to a cooler color (e.g., blue, green, purple, or tints and shades thereof) which may fill a corresponding image portion of the visualization frame.

Figure 2:
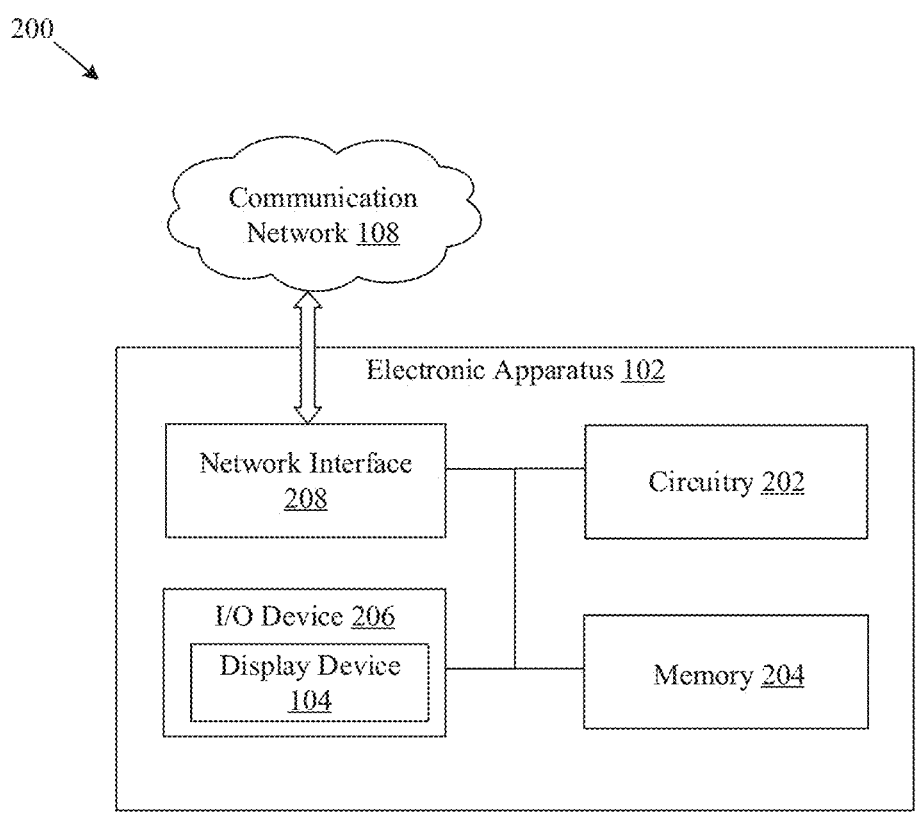
FIG. 2 is a block diagram that illustrates an exemplary electronic apparatus for heatmap visualization of object detections, in accordance with an embodiment of the disclosure.

FIG. 2 is a block diagram that illustrates an exemplary electronic apparatus for heatmap visualization of object detections, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206, and a network interface 208. The circuitry 202 may be communicatively coupled to the memory 204, the I/O device 206, and the network interface 208. In some embodiments, the I/O device may include a display device (such as the display device 104 of FIG. 1).

The circuitry 202 may include suitable logic, circuitry, and/or interfaces that may be configured to execute program instructions associated with different operations to be executed by the electronic apparatus 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store program instructions to be executed by the circuitry 202. In at least one embodiment, the memory 204 may be configured to store the first image frame, the generated visualization frame, and the DNN model 106. The memory 204 may be configured to store a color scheme to be used for the heatmap visualization. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. For example, the electronic apparatus 102 may receive a user input via the I/O device 206 to select an object of interest from multiple objects in an image frame and to initiate the XAI workflow (which includes object detection workflow and heatmap visualization workflow). Examples of the I/O device 206 may include, but are not limited to, a touch screen, a keyboard, a mouse, a joystick, a display device (for example, the display device 104), a microphone, or a speaker.

The network interface 208 may include suitable logic, circuitry, interfaces, and/or code that may be configured to facilitate the circuitry 202 to communicate with the display device 104 and/or other communication devices, via the communication network 108. The network interface 208 may be implemented by use of various known technologies to support wireless communication of the electronic apparatus 102 via communication network 108. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), or Worldwide Interoperability for Microwave Access (Wi-MAX).

The functions or operations executed by the electronic apparatus 102, as described in FIG. 1, may be performed by the circuitry 202. Operations executed by the circuitry 202 are described in detail, for example, in FIGS. 3A and 3B, FIG. 4, FIG. 5, FIG. 6, and FIG. 7.

Figure 3A:
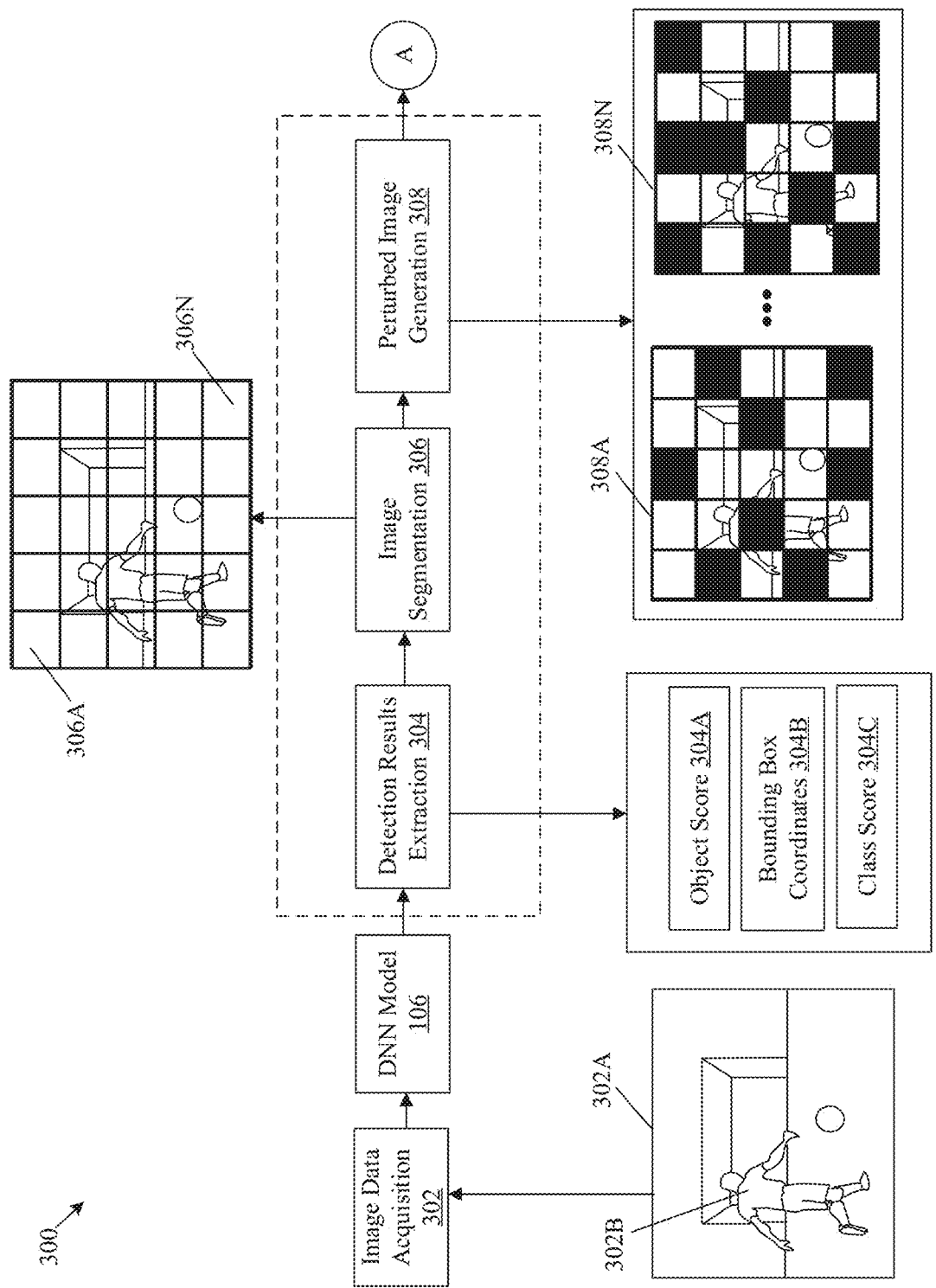
FIGS. 3A and 3B are diagrams that collectively illustrate exemplary operations for heatmap visualization of object detections, in accordance with an embodiment of the disclosure.
Figure 3B:
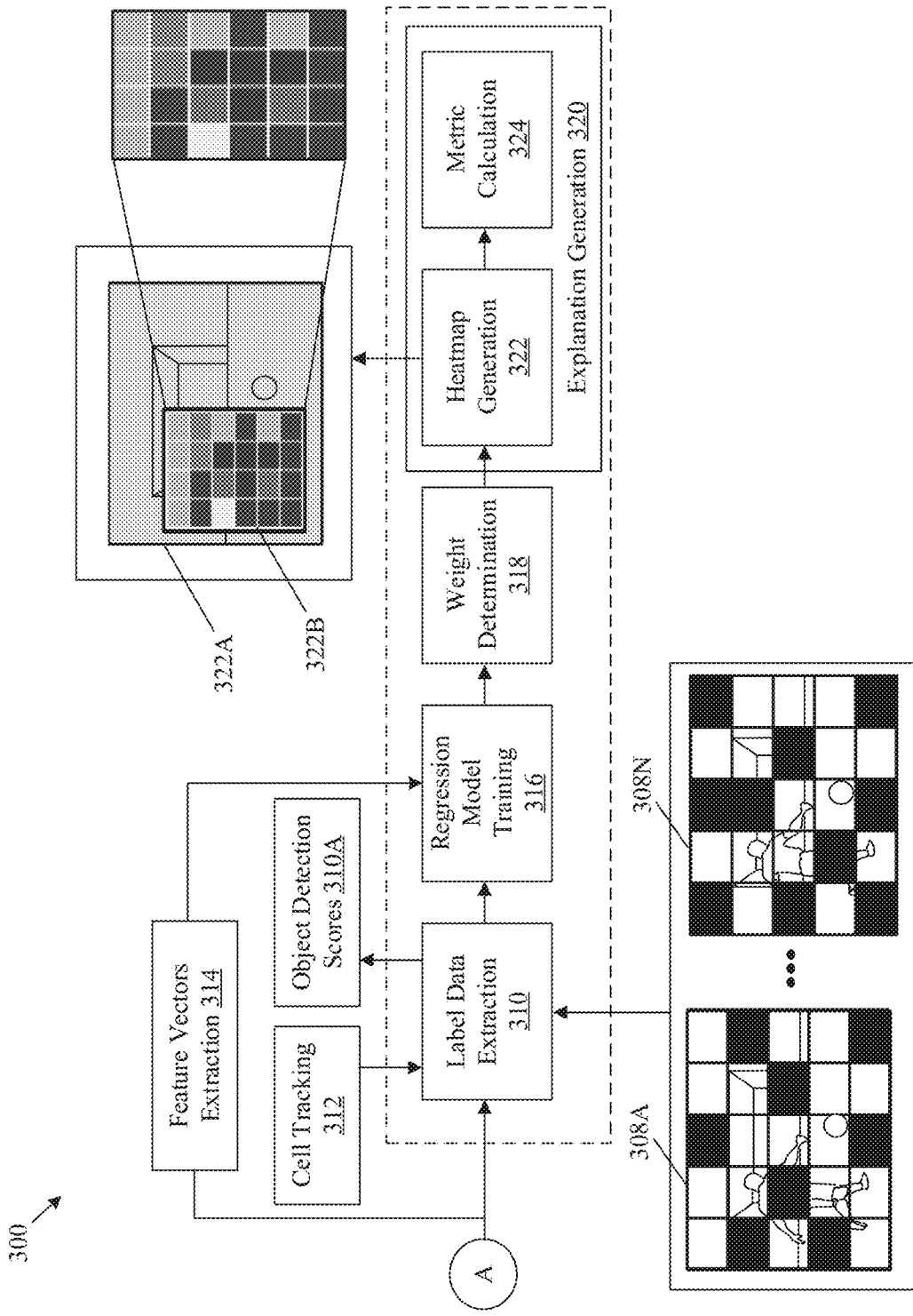

FIGS. 3A and 3B are diagrams that collectively illustrate exemplary operations for heatmap visualization of object detections, in accordance with an embodiment of the disclosure. FIGS. 3A and 3B are explained in conjunction with elements from FIG. 1 and FIG. 2. With reference to FIGS. 3A and 3B, there is shown a block diagram 300 that illustrates exemplary operations from 302 to 322, as described herein. The exemplary operations illustrated in the block diagram 300 may start at 302 and may be performed by any computing system, apparatus, or device, such as by the electronic apparatus 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, image data may be acquired. In an embodiment, the circuitry 202 may acquire image data from a data source. The data source may be, for example, an onboard image sensor, a persistent storage on the electronic apparatus 102, an image capture device, a cloud server, or a combination thereof. The image data may include image frames which may be shot at different times. Alternatively, the image data may include a sequence of image frames of a video feed. The image data may represent a static scene with fixed foreground or background objects or a dynamic scene with moving objects. Each image frame of the acquired image data may include at least one object of interest. From the acquired image data, the circuitry 202 may receive a first image frame 302A. As shown, for example, the first image frame 302A depicts a scene from a sports match and includes a soccer player as the object of interest 302B.

After the acquisition, the circuitry 202 may input the first image frame 302A to the DNN model 106. In some embodiments, the circuitry 202 may resize the input first image frame 302A to match a size of an input layer of the DNN model 106 and then pass the resized first image frame 302A to the input layer of DNN model 106

At 304, detection results may be extracted from the DNN model 106. In an embodiment, the circuitry 202 may extract an object detection result associated with the object of interest 302B, as an output of the DNN model 106 for the input first image frame 302A (or the resized first image frame 302A). For example, the object detection result may be a vector which may include an object score 304A for the object of interest 302B, bounding box coordinates 304B of a bounding box predicted to include the object of interest 302B, and class scores 304C (or class probabilities) for the object of interest 302B.

For example, for a 3-class object detection, the vector (Y) may be an 8-dimensional vector, as follows:

$$Y = \begin{bmatrix} O_c \\ b_x \\ b_y \\ b_h \\ b_w \\ c_1 \\ c_2 \\ c_3 \end{bmatrix} \quad (1)$$

where, $O_c$ represents the object score 304A which specifies whether the object of interest 302B is present or not in the input first image frame 302A (or the resized first image frame 302A), bx, by, bh, bw specify the bounding box coordinates 304B, and $c_1$, $c_2$, $c_3$ represent the class scores 304C.

The object score 304A may specify a confidence with which the DNN model 106 detects the object of interest 302B in the input first image frame 302A (or the resized first image frame 302A). In some instances, the object score 304A may be a binary value (0 or 1) or a floating-point number representing a likelihood between 0 and 1. A higher object score may denote a higher confidence level of the DNN model 106. In some embodiments, a threshold object score (e.g., 0.95) may be set to filter out object detection results in which the confidence of the detection is below the threshold object score. The class scores 304C may include soft labels or hard labels to represent object classes which can be detected by the DNN model 106. The object of interest 302B may belong to one of such classes. For example, if the DNN model 106 detects the object of interest 302B in class $c_1$, then the class scores 304C for the object of interest 302B may be 1 (or a number close to 1) for the class $c_1$ and 0 (or close to 0) for each of the class $c_2$ and the class $c_3$.

In some embodiments, the DNN model 106 may employ a region or grid-based detection approach, whereby the DNN model 106 may divide the input first image frame 302A (or the resized first image frame 302A) into a plurality of grid cells and may perform a cell-wise search for the detection of the object of interest 302B in one or more of the plurality of grid cells. In case multiple objects of interest overlap in common grid cells, anchor boxes may be specified to create a longer grid cell and multiple objects may be associated with the common grid cells. In case multiple objects of interest are present in different grid cells, then the DNN model 106 may output an object detection result for each of the different grid cells associated with the multiple objects of interest. After the object detection result is extracted, operations from 306 to 322 may be performed for heatmap visualization of the object of interest 302B, as described herein.

At 306, image segmentation may be performed. In an embodiment, the circuitry 202 may segment the first image frame 302A into a first plurality of image portions 306A . . . 306N based on the bounding box coordinates 304B. In another embodiments, before the segmentation is performed, the first image frame 302A may be resized to match a size of the input layer of the DNN model 106. For example, if the first image frame 302A is a High-Definition image (1280×720 pixels) but the size of the input layer is 416×416, then the first image frame 302A may be resized to 416×416 pixels.

The first image frame 302A (or the resized first image frame 302A) may be passed to a dynamic window segmentation function which segments the first image frame 302A (or the resized first image frame 302A) into the first plurality of image portions 306A . . . 306N based on a window size. In an embodiment, the circuitry 202 may select the window size for segmentation based on an input dimension (or size in pixels) of the first image frame 302A (or the resized first image frame 302A) and the bounding box coordinates 304B. Based on the selected window size, the circuitry 202 may segment the first image frame 302A (or the resized first image frame 302A) into the first plurality of image portions 306A . . . 306N. Pixels belonging to each image portion may be assigned a unique segment ID.

In an embodiment, the dynamic window segmentation function may divide the first image frame 302A (or the resized first image frame 302A) into a square or rectangular grid, where each grid cell may include one of the first plurality of image portions 306A . . . 306N. Depending on the size of objects or an image scale, the object of interest 302B may be present in one grid cell or may span across multiple grid cells of the square or rectangular grid, as described, for example, in FIG. 7.

At 308, perturbed images (i.e. unique neighborhood images) may be generated. In an embodiment, the circuitry 202 may generate a plurality of perturbed images 308A . . . 308N. In order to generate each perturbed image, a random sample selection operation and a masking operation may be executed, as described herein. Both operations may be iteratively executed to obtain the plurality of perturbed images 308A . . . 308N.

Initially, the circuitry 202 may execute a random sample selection of a first set of image portions from the first plurality of image portions 306A . . . 306N. For example, the input first image frame 302A is shown to be segmented into a 5×5 grid of 25 image portions using the window segmentation function. The circuitry 202 may randomly select 8 grid cells to select 8 image portions from the 5×5 grid of 25 image portions. The selection of grid cells (e.g., 8) may be based on a random selection of segment IDs which may be assigned to each image portion at 306. It should be noted that the above-mentioned grid size (5×5) is merely provided as an example. The present disclosure may be applicable to any suitable grid size, without a deviation from the scope of the disclosure.

After the random sample selection is executed, the circuitry 202 may select a portion of the first image frame 302A (or the resized first image frame 302A) which includes the first set of image portions (obtained through random sample selection). Thereafter, the circuitry 202 may apply a mask on the selected portion to generate a first perturbed image 308A of the plurality of perturbed images 308A . . . 308N. For example, the mask may be applied by setting all pixels of the selected portion as '126' or other suitable value between 0 and 255 if the first image frame 302A (or the resized first image frame 302A) has a color depth of 8-bits.

At 310, label data may be extracted. The label data may include a plurality of object detection scores 310A corresponding to the generated plurality of perturbed images 308A . . . 308N. For such extraction, a cell tracking operation at 312 may be executed while the DNN model 106 is reapplied on the plurality of perturbed images 308A . . . 308N to extract the label data from the DNN model 106, as described herein.

Initially, the circuitry 202 may determine, from a plurality of activation cells of the DNN model 106, a first activation cell which may be responsible for the object detection result (obtained at 304 from the DNN model 106). Each activation cell and anchor in the DNN model 106 may be assigned a unique ID. One of the cell anchors (i.e. the first activation cell responsible for the detection) may be selected and considered as a reference point. Thereafter, the circuitry 202 may input the first perturbed image 308A of the plurality of perturbed images 308A . . . 308N to the DNN model 106 and may extract a first object detection score for the first perturbed image 308A from a first output of the selected first activation cell of the DNN model 106. The first object detection score may be one of: the plurality of object detection scores 310A corresponding to the plurality of perturbed images 308A . . . 308N.

Each of the plurality of perturbed images 308A . . . 308N may be passed as input to the DNN model 106 as part of an iterative feeding process and the reference point (i.e. the first activation cell or the selected cell-anchor) may be tracked throughout the iterative feeding process. The output values (such as the first object detection score) from the reference point (i.e. the first activation cell) may be considered as a first sample of the label data.

In case there are multiple objects of interest (non-overlapping) in the first image frame 302A, then the DNN model 106 may identify and select multiple activation cells, each of which may be associated with one of the multiple objects of interest. In such a case, the circuitry 202 may track such multiple activation cells to detect an object detection score for each of the multiple objects of interest throughout the iterative feeding process.

At 314, a plurality of feature vectors may be extracted. Such feature vectors may also be referred to as unique segmentation features. In an embodiment, the circuitry 202 may generate a first feature vector of a plurality of feature vectors for the first perturbed image 308A of the plurality of perturbed images 308A . . . 308N. The generated first feature vector may include a plurality of vector elements. Each vector element may correspond to a corresponding image portion (or a segment ID of the corresponding image portion) of the first plurality of image portions 306A . . . 306N. For example, if the first image frame 302A (or the resized first image frame 302A) is segmented into a 10×10 grid, including 100 image portions with each image portion having a unique segment ID, then the first feature vector may be a 1×100 vector with 100 vector elements. Each vector element of the plurality of vector elements may store a value which may indicate whether the corresponding image portion is masked in the first perturbed image 308A. For example, for 5×5 window segmentation, if the first perturbed image 308A includes 10 image portions and 15 image portions as masked and unmasked, respectively, then the first feature vector may store a value (0) in 10 vector elements (which correspond to the 10 image portions) and a value (1) in 15 vector elements (which correspond to 15 image portions). Similarly, feature vectors for all the perturbed images may be generated.

At 316, a regression model may be trained. In an embodiment, the circuitry 202 may train the regression model on the plurality of feature vectors (extracted at 314) and the plurality of object detection scores 310A (extracted as the label data at 310). The regression model may be described in terms of response variables, explanatory variables, and unknown model parameters (referred to as weight values) which quantify a strength of relationship between the explanatory variables and the response variables. Here, the plurality of feature vectors may be referred to as the explanatory variables (i.e. independent variables) and the plurality of object detection scores 310A may be referred to as the response variables. In training, values the unknown model parameters, i.e. the weights values may be estimated by fitting the regression model on the plurality of feature vectors and the plurality of object detection scores 310A. A cost function, such as least square error (LS) may be used to minimize a fitting error associated with the regression model.

At 318, weight values may be determined. In an embodiment, the circuitry 202 may determine the weight value for each image portion of the first plurality of image portions 306A . . . 306N based on the trained regression model. The weight value may be indicative of a likelihood that a corresponding image portion of the first plurality of image portions 306A . . . 306N belongs to the object of interest 302B.

By use of the unique segment ID, each weight value may be mapped to a corresponding image portion of the first image frame 302A (or the resized first image frame 302A). All image portions (obtained after segmentation at 306) which belong to the object of interest 302B may be associated with high weight values (e.g., values close to 1) and other image portions may be associated with low weight values (e.g. values close to 0).

At 320, an explanation generation operation may be performed. In such an operation, a heatmap generation may be performed at 322 which may be followed by followed by a metric calculation at 324.

At 322, a heatmap may be generated. In an embodiment, the circuitry 202 may generate a visualization frame 322A based on the determined weight value for each image portion of the first plurality of image portions 306A . . . 306N. The visualization frame 322A may include a heatmap visualization 322B of a region which is included in the first image frame 302A and is bounded by the bounding box coordinates 304B.

In an embodiment, the circuitry 202 may select, from a heatmap color palette, a color value which is representative of the determined weight value. The color value may be selected based on a heatmap color scheme for a range of weight values. For example, the heatmap color palette may be a rainbow palette which may represent a low weight value with a cold color (e.g., blue, green, violet, shades, or tints thereof) and a high weight value with a warm color (e.g., red, yellow, orange, shades, or tints thereof). Other examples of the heatmap color palette may include, but are not limited to sequential palettes, diverging palettes, or qualitative palettes. Thereafter, based on the selected color value for each image portion of the first plurality of image portions 306A . . . 306N, the visualization frame 322A may be generated. After the visualization frame 322A is generated, the circuitry 202 may display the visualization frame 322A on a display device (such as the display device 104) in order to provide a user friendly and reliable heatmap visualization of the object of interest 302B (as detected in the first image frame 302A).

At 324, a metric calculation of the heatmap visualization may be performed. In an embodiment, the circuitry 202 may select a bounding box (i.e. predicted by the DNN model 106) around the object of interest 302B in the input first image frame 302A (or the resized first image frame 302A). The selected bounding box may be determined by the bounding box coordinates in the object detection result of the DNN model 106.

The circuitry 202 may determine a first count of weight values ($N_{inside+}$) which may be greater than zero and may lie inside the selected bounding box. The circuitry 202 may further determine a second count of weight values ($N_{inside0}$) which may equal zero inside the selected bounding box. While the first count of weight values ($N_{inside+}$) may indicate a number of image portions of the first image frame 302A which may be a part of the object of interest 302B and may lie inside the selected bounding box, the second count of weight values ($N_{inside0}$) may indicate remaining number of image portions which may not be a part of the object of interest 302B but may still lie inside the selected bounding box. Both the first count and the second count of weight values may be determined based on the determined weight value for each image portion of the first plurality of image portions 306A . . . 306N. Thereafter, the circuitry 202 may compute a first visual metric ($F_{weight}$) as a ratio of the determined first count to a sum of the determined first count and the determined second count. A formulation of the first visual metric ($F_{weight}$) is provided by equation (1), as follows:

$$F_{weight} = \frac{N_{inside+}}{N_{inside+} + N_{inside0}} \quad (1)$$

The first visual metric may represent an accuracy with which each weight value is determined through the regression model. A higher accuracy may require the second count of weight values to be low as compared to the first count of weight values. This may mean that the heatmap visualization may be required to have a maximum coverage of the object of interest 302B within a focus area of a visualization frame.

In an embodiment, the circuitry 202 may determine a first sum of a first set of weight values ($W_x$, $x \in \{0, M\}$ and $W_x > 0$) which may be greater than zero inside the selected bounding box. The circuitry 202 may further determine a second sum of a second set of weight values ($W_y$, $y \in \{0, N\}$, $x \cap y = \varphi$, and $W_y > 0$) which may be greater than zero outside the selected bounding box. Both the first set and the second set of weight values may be determined based on the determined weight values for the first plurality of image portions 306A . . . 306N. The circuitry 202 may compute a second visual metric ($F_{spread}$) as a ratio of the determined first sum to a sum of the determined first sum and the determined second sum. A formulation of the second visual metric ($F_{spread}$) is provided by equation (2), as follows:

$$F_{spread} = \sum_{x=0}^{M} W_x \bigg/ \left( \sum_{x=0}^{M} W_x + \sum_{y=0}^{N} W_y \right) \quad (2)$$

where,
x may represent an index of a weight value in the first set of weight values, and
y may represent an index of a weight value in the second set of weight values.

Such metrics (the first visual metric or the second visual metric) may help a user or a program developer to evaluate or retrain the DNN model 106 to obtain better, more accurate object detection results, which may lead to accurate heatmap visualizations.

Figure 3C:
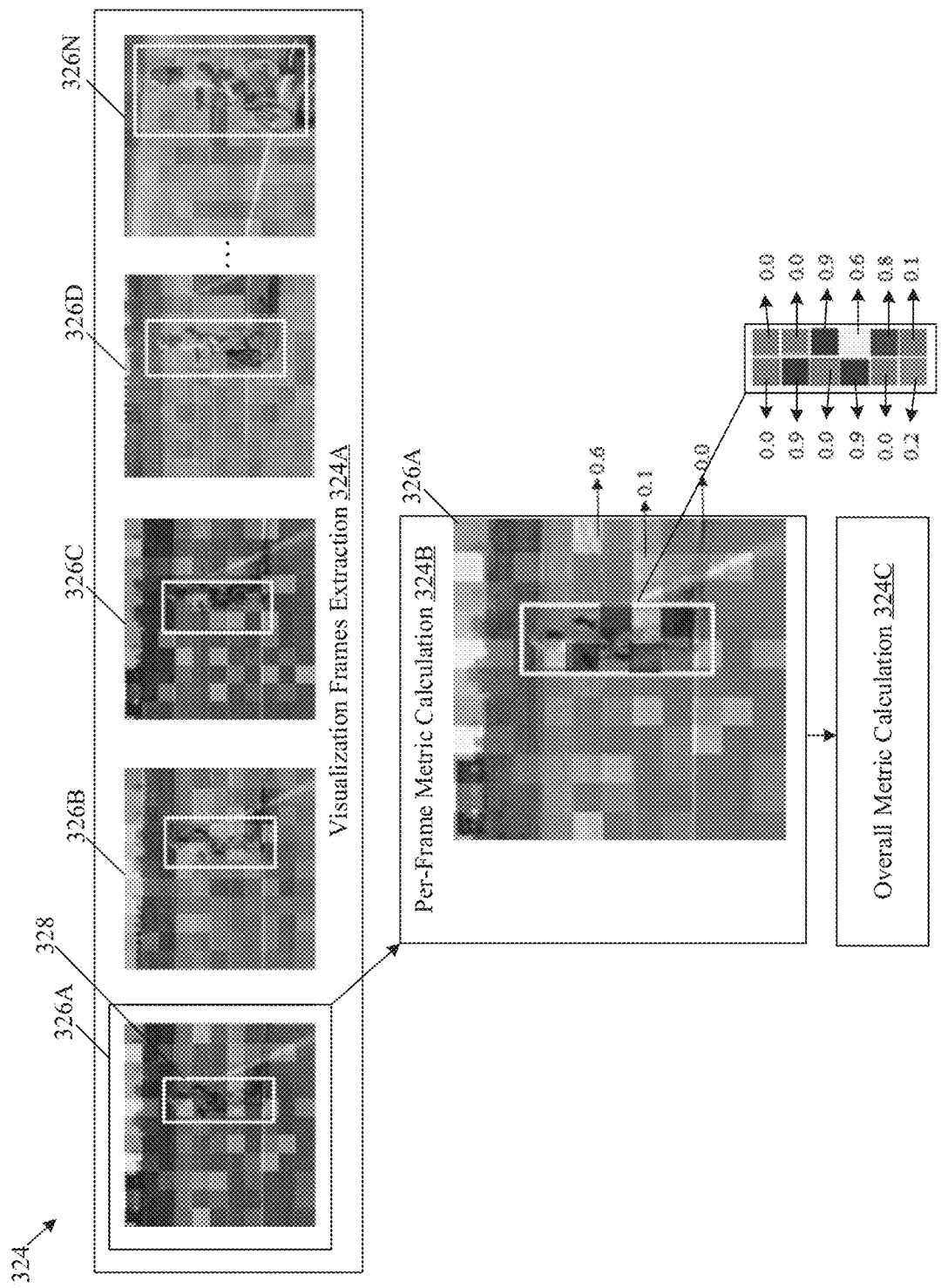
FIG. 3C is a diagram that illustrates exemplary operations of heatmap metric calculations for a video, in accordance with an embodiment of the disclosure.

FIG. 3C is a diagram that illustrates exemplary operations of heatmap metric calculations for a video, in accordance with an embodiment of the disclosure. FIG. 3C is explained in conjunction with elements from FIG. 1, FIG. 2, FIG. 3A, and FIG. 3B. With reference to FIG. 3C, there is shown a sequence of exemplary operations from 324A to 324C, which are a part of the metric calculations at 324 of FIG. 3B The operations may start from 324A and may be performed by any computing system, apparatus, or device, such as by the electronic apparatus 102 of FIG. 1 or FIG. 2.

At 324A, a sequence of visualization frames 326A, 326B, 326C, 326D . . . 326N may be extracted. In an embodiment, the circuitry 202 may extract the sequence of visualization frames 326A, 326B, 326C, 326D . . . 326N from the memory 204. The sequence of visualization frames 326A, 326B, 326C, 326D . . . 326N may be generated frame-by-frame based on the heatmap visualization operation of 322. Each visualization frame of the sequence of visualization frames 326A, 326B, 326C, 326D . . . 326N may include a heatmap visualization of a region, which may be included in a respective input image frame of a video and may be bounded by bounding box coordinates. For example, a first visualization frame 326A may include a heatmap visualization of a region which may be included within a bounding box 328A. The region may correspond to an object of interest, such as a body riding a bike.

At 324B, a per-frame metric calculations may be performed. In an embodiment, the circuitry 202 may calculate a first visual metric ($F_{weight}$) and a second visual metric ($F_{spread}$) for each of the sequence of visualization frames 326A, 326B, 326C, 326D . . . 326N.

Each visualization frame may be divided into a number of segments, a color of which may depend on a weight value associated with a respective segment and a color palette. For example, if a weight value is close to 1, the color of an associated segment of a visualization frame may be close to a warm color, such as red. Whereas, if a weight value is close to 0, the color of an associated segment of the visualization frame may be close to a cold color, such as blue. The number of segments may determine a resolution of the heatmap visualization. A higher number of segments may result in a greater resolution of the heatmap visualization, while lower number of segments may result in a pooper resolution.

For example, as shown, the first visualization frame 326A includes 10×10 segments or 100 segments and the region within the bounding box 328 includes 12 segments. For the first visualization frame 326A, the count of positive weight values inside the bounding box 328 is 7 and the count of zero valued weight values inside the bounding box 328 is 5. The first visual metric ($F_{weight}$) may be determined using equation (1), as follows:

$$F_{weight} = \frac{7}{7+5} = 0.583$$

For the first visualization frame 326A, the second visual metric ($F_{spread}$) may be determined using equation (2), as follows:

$$F_{spread} = \frac{0.9 \times 3 + 0.8 \times 1 + 0.6 \times 1 + 0.1 \times 1 + 0.0 \times 5}{(0.9 \times 3 + 0.8 \times 1 + 0.6 \times 1 + 0.2 \times 1 + 0.1 \times 1) + (0.6 \times 6 + 0.1 \times 10 + 0.0 \times 84)}$$

$$F_{spread} = \frac{4.2}{4.2 + 4.6} = 0.477$$

From the foregoing example, the first visualization frame 326A is associated with a $F_{weight}$ of 0.583 and a $F_{spread}$ of 0.477. A higher value of $F_{spread}$ may indicate that more high-weighted segments lie within the bounding box 328, thereby indicating more weighted areas on the object of interest. Whereas, a higher value of $F_{weight}$ may indicate that more count of high-weighted segments lies within the bounding box 328, thereby indicating more focus areas on the object of interest.

At 324C, an overall metric calculation may be performed for the sequence of visualization frames 326A, 326B, 326C, 326D . . . 326N. After that, values of $F_{spread}$ and $F_{weight}$ for each of the sequence of visualization frames 326A, 326B, 326C, 326D . . . 326N may be recorded in a database, as shown in following Table 1:

TABLE 1

| Visualization Frame # | $F_{spread}$ | $F_{weight}$ |
|---|---|---|
| | $F_{spread}$ and $F_{weight}$ values | |
| 326A | 0.477 | 0.583 |
| 326B | 0.412 | 0.625 |
| 326C | 0.503 | 0.590 |
| . . . | . . . | . . . |
| 326N | 0.725 | 0.610 |

Based on the first visual metric and the second visual metric (i.e. $F_{weight}$ and $F_{spread}$ values), the circuitry 202 may determine whether a heatmap visualization is correctly generated. If such values are above than a threshold, the object of interest may be determined to be recognized in all corresponding frames of the video. In some embodiments, the circuitry 202 may generate a graph representing such values for each visualization frame of the sequence of the sequence of visualization frames 326A, 326B, 326C, 326D . . . 326N. Based on peaks in the graph, the circuitry 202 may determine a next action, such as an inference related to the object of interest. Even if objects are small, the graph may help in interpretation and making conclusions.

Figure 4:
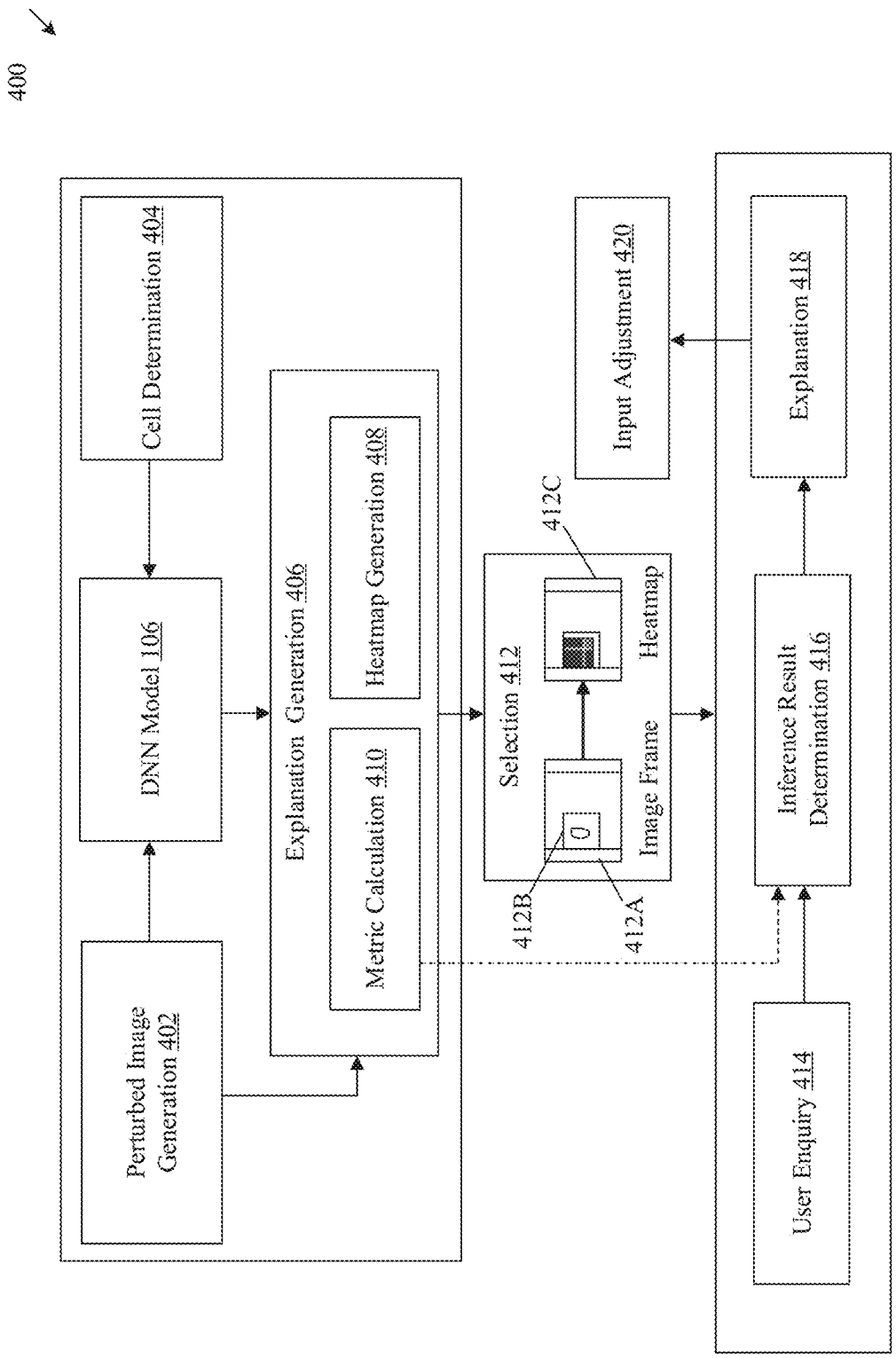
FIG. 4 is a block diagram that illustrates exemplary operations of an end-to-end explanation Artificial Intelligence (XAI) solution using the electronic apparatus of FIG. 2, in accordance with an embodiment of the disclosure.

FIG. 4 is a block diagram that illustrates exemplary operations of an end-to-end explanation Artificial intelligence (XAI) solution using the electronic apparatus of FIG. 2, in accordance with an embodiment of the disclosure. FIG. 4 is explained in conjunction with elements from FIGS. 1, 2, 3A, and 3B. With reference to FIG. 4, there is shown a block diagram 400 that illustrates exemplary operations from 402 to 420, as described herein. The exemplary operations illustrated in the block diagram 400 may start from 402 and may be performed by any computing system, apparatus, or device, such as by the electronic apparatus 102 of FIG. 1 or FIG. 2.

Although illustrated with discrete blocks, the exemplary operations associated with one or more blocks of the block diagram 400 may be divided into additional blocks, combined into fewer blocks, or eliminated, depending on implementation of the exemplary operations.

At 402, perturbed images may be generated. In an embodiment, the circuitry 202 may generate a plurality of perturbed images from a first image frame 412A. In order to generate each perturbed image, a random sample selection operation and a masking operation may be executed. Details of such operations are provided in FIG. 3A, for example, from 306 to 308 of FIG. 3A. The random sample selection operation and the masking operation are described in detail, for example, in FIG. 6.

At 404, a cell may be determined using a cell plugin. In an embodiment, the circuitry 202 may determine, from a plurality of activation cells of the DNN model 106, a first activation cell which may be responsible for the object detection result (such as the objection detection result at 304). Each activation cell and anchor in the DNN model 106 may be assigned a unique ID. One of the cell anchors (i.e. the first activation cell responsible for the detection) may be selected and considered as a reference point.

At 406, explanation generation may be performed. In an embodiment, the circuitry 202 may generate explanations associated with an object detection result of the DNN model 106 for the first image frame 412A as input. The operation at 406 may include a first operation of a heatmap generation at 408 and a second operation of metric calculations at 410.

At 408, a heatmap may be generated. In an embodiment, the circuitry 202 may generate a visualization frame 412C based on the execution of the operation at 322 of FIG. 3B. The visualization frame 412C may include a heatmap visualization of a region 412B which is included in the first image frame 412A and is bounded by bounding box coordinates (represented by a bounding box in FIG. 4).

At 410, metric calculations may be performed. In an embodiment, the circuitry 202 may determine a first visual metric ($F_{weight}$) and a second visual metric ($F_{spread}$) for the visualization frame 412C based on weight values for segments of the visualization frame 412C. In case there is a sequence of visualization frames (as described in FIG. 3C, for example), the circuitry 202 may determine the first visual metric ($F_{weight}$) and the second visual metric ($F_{spread}$) for each of the sequence of visualization frames. Details of the metric calculations is provided, for example, in FIG. 3B and FIG. 3C.

At 412, a selection may be performed. After the visualization frame 412C is generated. The user may be provided with an option on the display device 104 to view the heatmap visualization of the region 412B which includes an object of interest. In case there are multiple visualization frames (such as the sequence of visualization frames 326A, 326B, 326C, 326D . . . 326N) corresponding to multiple image frames, the circuitry 202 may display such visualization frames on the display device 104. In some embodiments, the circuitry 202 may also display a graph which may include the first visual metric and the second visual metric for each of such visualization frames. The user may decide to select any specific visualization frame of the displayed visualization frames. For example, the user may select a visualization frame which corresponds to a peak of the first visual metric or the second visual metric in the graph.

In case the visualization frame 412C includes heatmap visualization of multiple objects, the user may be able to select and view the heatmap visualization one of the multiple objects. In an embodiment, the circuitry 202 may select an object of interest from the visualization frame 412C based on a user input. The selection may be performed to display a heatmap for the selected object of interest. The circuitry 202 may update the visualization frame to include the heatmap visualization of the region 412B which includes the selected object of interest. In some embodiment, if there is a sequence of visualization frames (such as a heatmap video), then the heatmap visualization of the selected object of interest may be updated in the sequence of visualization frames while the heatmap visualization of regions which include other objects (not selected by the user) may be removed from the sequence of visualization frames.

At 414, a user enquiry may be received when the visualization frame 412C is displayed on the display device 104. In an embodiment, the circuitry 202 may receive the user enquiry via the display device 104. The user enquiry may enable an end user to make a choice about selecting an object of interest for explanation.

At 416, an inference result may be determined. In an embodiment, the circuitry 202 may determine an inference result associated with the selected object of interest based on the user enquiry (received at 412). In an embodiment, the circuitry 202 may extract a set of observations associated with the selected object of interest. The set of observations may be extracted based on the generated visualization frame 412C. In an embodiment, the set of observations may be extracted further based on the first visual metric and the second visual metric for the visualization frame 412C. Details associated with the first visual metric and the second visual metric are provided, for example, in FIG. 3B and FIG. 3C. The circuitry 202 may determine the inference result associated with the selected object of interest based on the extracted set of observations. Examples of the determined inference result may include, but are not limited to, numerical values for a visual attribute or a state of the selected object of interest. Example of the visual attribute or the state may include, but are not limited to, changes in the object size, object movement or rotation, object deformation (e.g., a change in human pose), or object visibility (such as a blur value), object action (such as articulate joint motion of a human object), or object interactions with other objects (such as a human pedaling a cycle).

For example, the determined inference result may include a higher (above a threshold) numerical value when the extracted observation includes an increase in the visibility of the object of interest in successive image frames. Whereas, the determined inference result may include a lower numerical value (lower than a threshold), when the observation includes a decrease in the visibility of the object of interest in successive image frames. In an embodiment, the circuitry 202 may generate a graphical representation of the determined inference result.

At 418, explanations may be generated. In an embodiment, the circuitry 202 may generate an explanation based on the determined inference result. The generated explanation may include a natural language description of the determined inference result. In an embodiment, the circuitry may apply natural language processing (NLP) techniques to generate the natural language description. In an embodiment, the circuitry 202 may control a display device (such as the display device 104) to display the generated explanation. For example, based on the inference result for a sequence of visualization frames (includes a heatmap visualization), it may be determined that a visibility of the object of interest (user selected) increases in successive frames, then the explanation may include a natural language description "Objects visibility is increasing".

In an embodiment, the circuitry 202 may determine a plurality of recommendations associated with the generated explanation based on the determined inference result. The plurality of recommendations may include, for example, a feedback to a data source or a feedback to an external system. The circuitry 202 may control the display device 104 to display the generated plurality of recommendations associated with the determined explanation. The circuitry 202 may further receive an input which includes a selection of a first recommendation from the plurality of recommendations. The circuitry 202 may select the first recommendation of the plurality of recommendations based on the received input and may adjust certain image parameters associated with the input first image frame 410A based on the selected first recommendation. Details associated with the recommendation are described, for example, in FIG. 5.

At 422, an input adjustment may be performed. In an embodiment, the circuitry 202 may receive a user input which includes a selection of a visualization frame having lower values of the first visual metric or the second visual metric. In such a case, the circuitry 202 may generate an instruction to adjust at least one imaging parameter of an input source (such as a camera which initially acquired the multiple images). For example, if the selected visualization frame, having lower values of the first visual metric or the second visual metric is generated from an underexposed image frame, then the circuitry 202 may generate an instruction to adjust a sensor gain of the input source.

Figure 5:
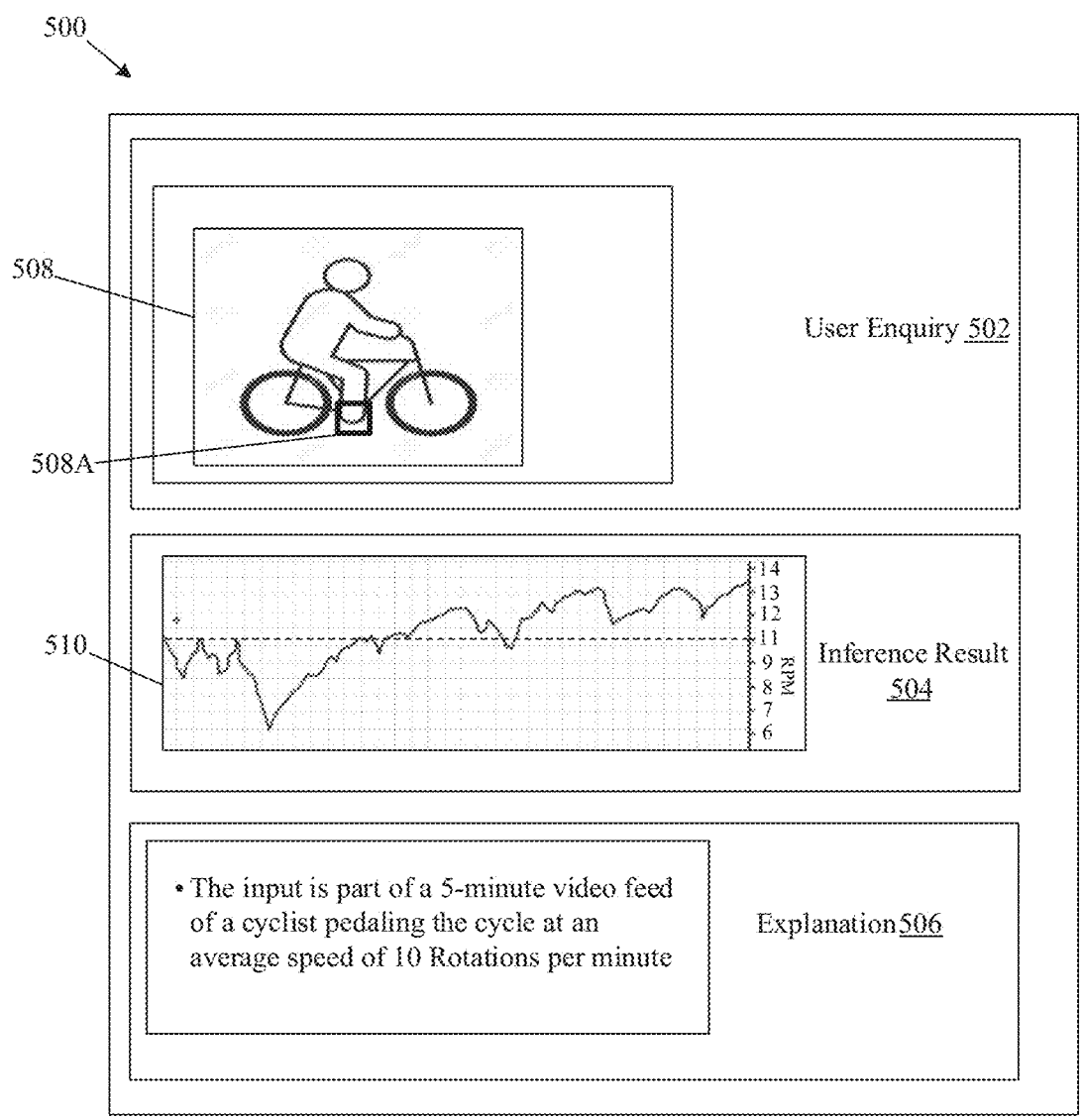
FIG. 5 is a diagram that illustrates an exemplary user interface for an electronic apparatus for a heatmap visualization of object detection, in accordance with an embodiment of the disclosure.

FIG. 5 is a diagram that illustrates an exemplary user interface for an electronic apparatus for a heatmap visualization of object detection, in accordance with an embodiment of the disclosure. FIG. 5 is explained in conjunction with elements from FIGS. 1, 2, 3A, 3B, and 4. With reference to FIG. 5, there is shown a user interface (UI) 500 that may display the determined inference result of FIG. 4, and the generated explanation of FIG. 4. The circuitry 202 control the display device 104 to display the UI 500. For example, as shown, the UI 500 may display an interface for a user enquiry 502, an inference result 504, and an explanation 506.

In an embodiment, the input first image frame 508 may depict a person ridding a cycle. The circuitry 202 may receive an input which includes a selection of the object of interest 508A. The circuitry 202 may select the object of interest 508A based on the received input. For example, the selected object of interest 508A may be the paddle of the cycle.

In an embodiment, the circuitry 202 may determine the inference result 504 associated with the selected object of interest 508A. For example, the inference result 504, associated with the selected object of interest 508A, is shown as a graphical representation 510. In the graphical representation 510, the inference result 504 includes numerical values representing a state of the selected object of interest 508A. For example, the numerical values may include rotation per minute (RPM) measurements associated with a moving state of the paddle. Such measurements may be calculated based on the metrics calculation operation at 324 of FIG. 3B or FIG. 3C.

In an embodiment, the circuitry 202 may generate the explanation 506 based on the determined inference result 504. The explanation 506 may include a natural language description of the determined inference result 504. As shown, the explanation 506 may include a description "the input is part of a 5-minute video feed of a cyclist pedaling the cycle at an average speed of 10 rotations per minute". It should be noted that information shown in the UI 500 is presented merely as an example and should not be construed as limiting for the disclosure. In some embodiments, the circuitry 202 may transmit a feedback to an image source, such as an image-capture device to adjust imaging parameters (such as a f-stop value, a sensor gain, or a shutter speed) associated with the source.

Figure 6:
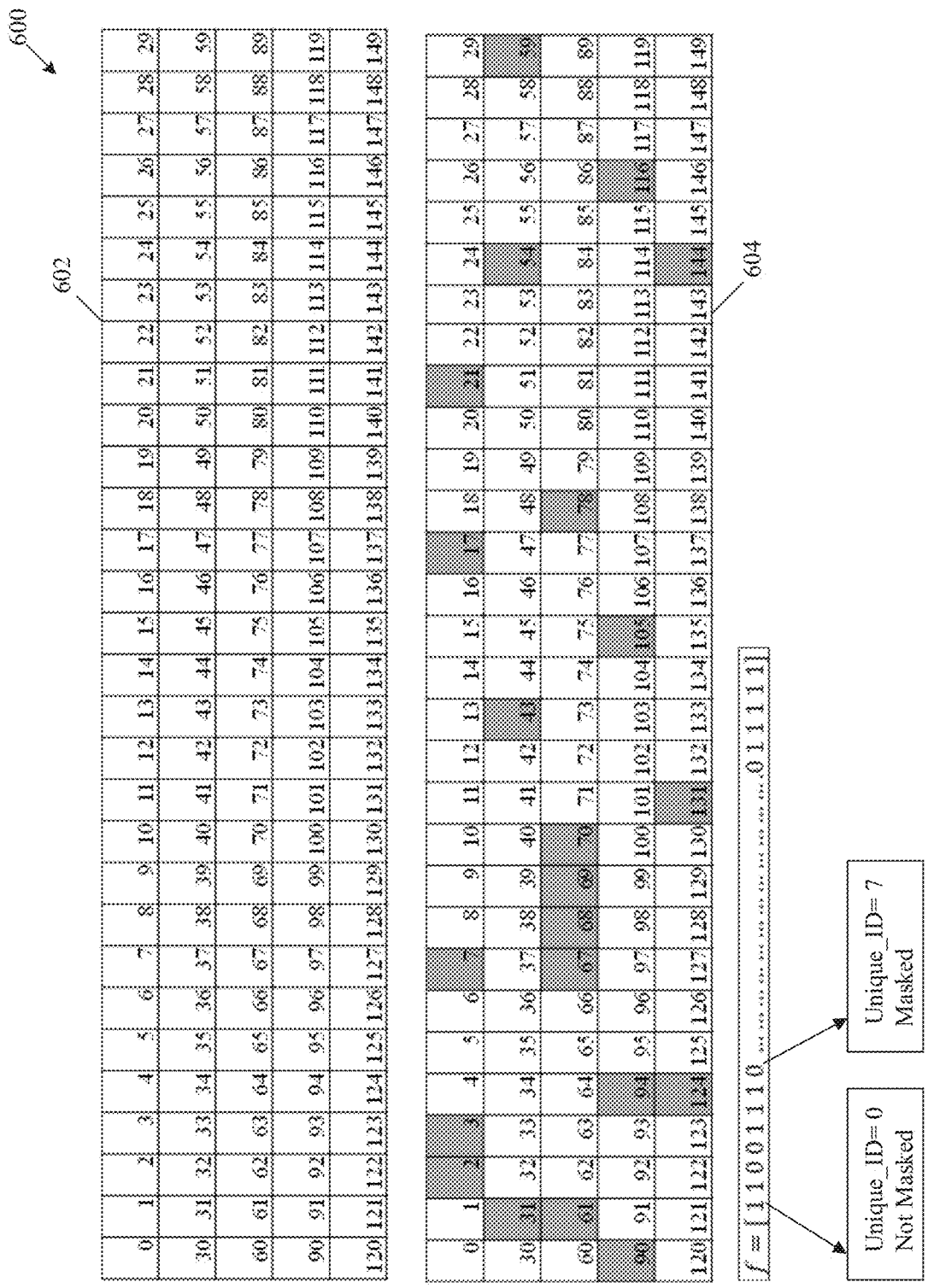
FIG. 6 is a diagram that illustrates an exemplary scenario for generation of a first perturbed image, in accordance with an embodiment of the disclosure.

FIG. 6 is a diagram that illustrates an exemplary scenario for generation of a first perturbed image, in accordance with an embodiment of the disclosure. FIG. 6 is explained in conjunction with elements from FIGS. 1, 2, 3A, 3B, 4, and 5. With reference to FIG. 6, there is shown a first image frame 602 and a first perturbed image 604, which may be obtained from the first image frame 602.

In an embodiment, the first image frame 602 may have a size of 300×50 pixels and the window size of the input layer of the DNN model 106 may be 10×10. The first image frame 602 may be passed to a dynamic window segmentation function (as described at 306) which may segment the first image frame 602 into a first plurality of image portions based on the window size. For example, the first image frame 602 is shown to be segmented into a 5×30 grid of 150 image portions using the window segmentation function The DNN model 106 may assign a unique ID to each segmented portion as 0, 1, 2, 3, . . . , 149, as shown.

In an embodiment, the circuitry 202 may execute a random sample selection (as described in FIG. 3) of a first set of image portions from the first plurality of image portions (labelled 0, 1, 2, 3, . . . , 149). After the random sample selection is executed, the circuitry 202 may select a portion of the first image frame 602 which includes the first set of image portions (obtained through random sample selection). Thereafter, the circuitry 202 may apply a mask on the selected portion to generate the first perturbed image 604. For example, the mask may be applied by setting all pixels of the selected portion as '126' or other suitable value between 0 and 255 if the first image frame 602 has a color depth of 8-bits. For example, for the 5×30 window segmentation, if the first perturbed image 604 includes 22 image portions and 128 image portions as masked and unmasked, respectively, then the first feature vector may store a value (0) in 22 vector elements (which correspond to the 22 image portions) and a value (1) in 128 vector elements (which correspond to 128 image portions). In the FIG. 6, there is shown a feature vector which may store a value (1) for a segment with the unique ID '0' (to denote unmasked). The feature vector may store a value (0) for another segment with a unique ID '7' (to denote masked). Similarly, feature vectors for all the perturbed images may be generated. The dimensions of a feature vector may be, for example, 1×num_segment, where num_segment is number of unique segments. It is a binary vector, elements are either 1 or 0. If the respective segment is masked, then value of the index is 0 in the feature vector. If the respective segment is unmasked, then value of the index is 1 in the feature vector.

It should be noted that the first image frame 602 and the first perturbed image 604 are presented merely as an example and should not be construed as limiting the scope of the disclosure.

Figure 7:
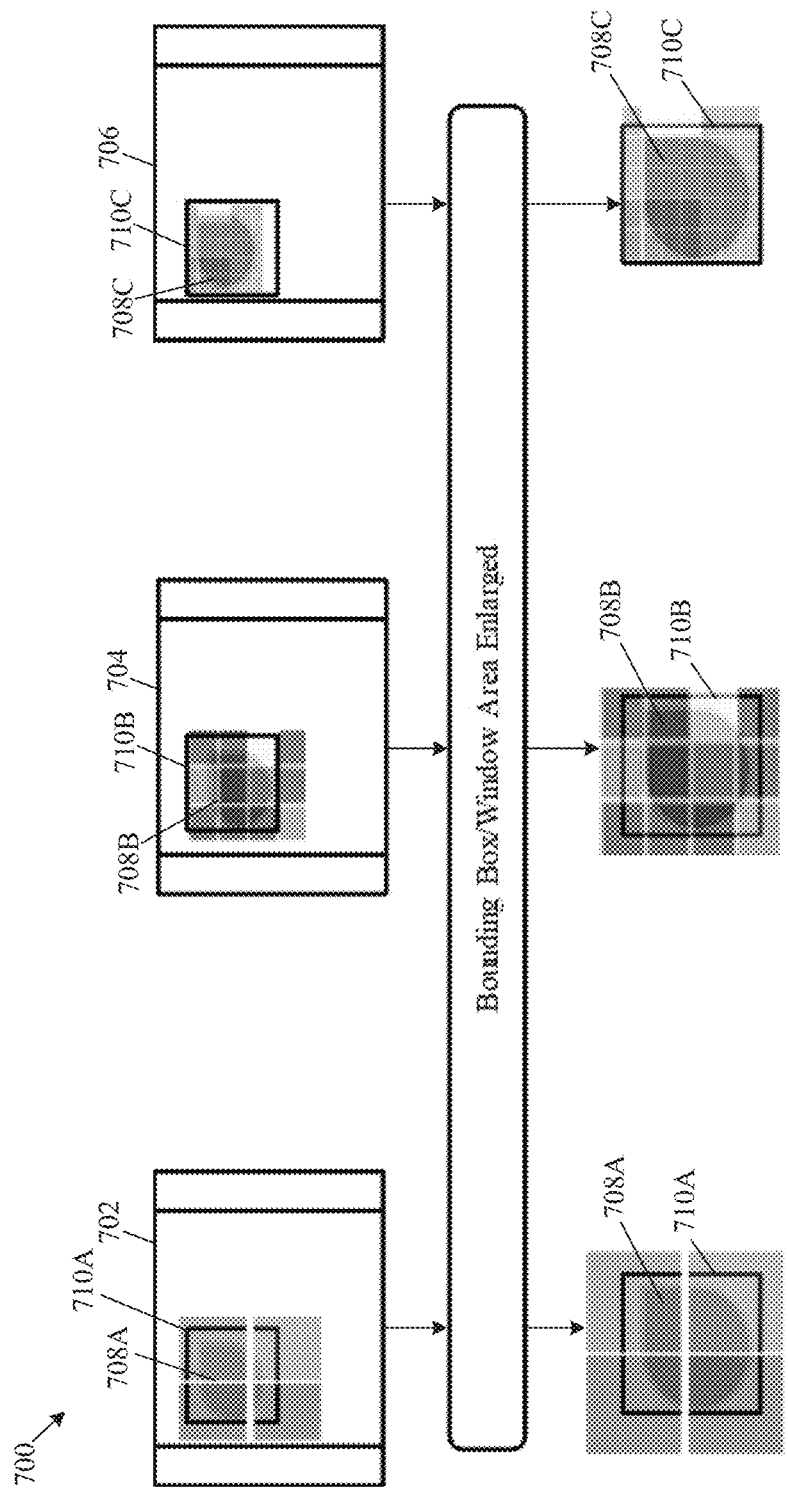
FIG. 7 is a diagram that illustrate an exemplary relation between a dynamic window segmentation function and heatmaps of objects with different window sizes, in accordance with an embodiment of the disclosure.

FIG. 7 is a diagram that illustrate an exemplary relation between a dynamic window segmentation function and heatmaps of objects with different window sizes, in accordance with an embodiment of the disclosure. FIG. 7 is explained in conjunction with elements from FIGS. 1, 2, 3A, 3B, 4, 5, and 6. With reference to FIG. 7, there is shown a first visualization frame 702, a second visualization frame 704, a third visualization frame 706. The first visualization frame 702 may include a heatmap visualization 708A of an object of interest 708, and a bounding box 710A around a region which includes the heatmap visualization 708A of the object of interest 708. The second visualization frame 704 may include a heatmap visualization 708B of the object of interest 708, and a bounding box 710B around a region which includes the heatmap visualization 708B of the object of interest 708. The third visualization frame 706 may include a heatmap visualization 708C of the object of interest 708, and a bounding box 710C around a region which includes the heatmap visualization 708C of the object of interest 708. An enlarged view of the heatmap visualization 708A, the heatmap visualization 708B, and the heatmap visualization 708C is also shown.

The dynamic window segmentation function may control a coarseness of a heatmap visualization. If the window size is less, then a finer heatmap visualization may be is obtained, and vice versa. In order to obtain an optimal window size, a method may be implemented, where bounding box dimensions and input image dimensions contribute in a dynamic selection of the window size. This may help to provide a finer heatmap.

In the first visualization frame 702, the window size is larger and the heatmap visualization 708A is coarser. This leads to more noise in focused area. In the second visualization frame 704, the window size is smaller than that for the first visualization frame 702. Hence, there is less noise in the focus area than that of the first visualization frame 702 and the heatmap visualization 708B is more precise than the heatmap visualization 708A. In the third visualization frame 706, the window size is smaller than that for the second visualization frame 704. Hence, there is less noise in the focus area than that of the second visualization frame 704 and the heatmap visualization 708C is more precise than the heatmap visualization 708B. For the same size of a bounding box, when the window is large, the metric calculation (as calculated at 322 of FIG. 3B) is not very accurate. However, for a smaller window size, metrics are much precise.

The object size may be one of the factors in determining the window size. Therefore, in at least one embodiment, the circuitry 202 change the window size based on the object size. In a multi-object scenario, such as when there are two objects in an input image, a heatmap visualization may be generated for both the objects. However, the heatmap visualization of one object may be coarser than that of the other object, due to different window sizes for both the objects. These different window sizes may depend on the object size of both the objects.

Figure 8:
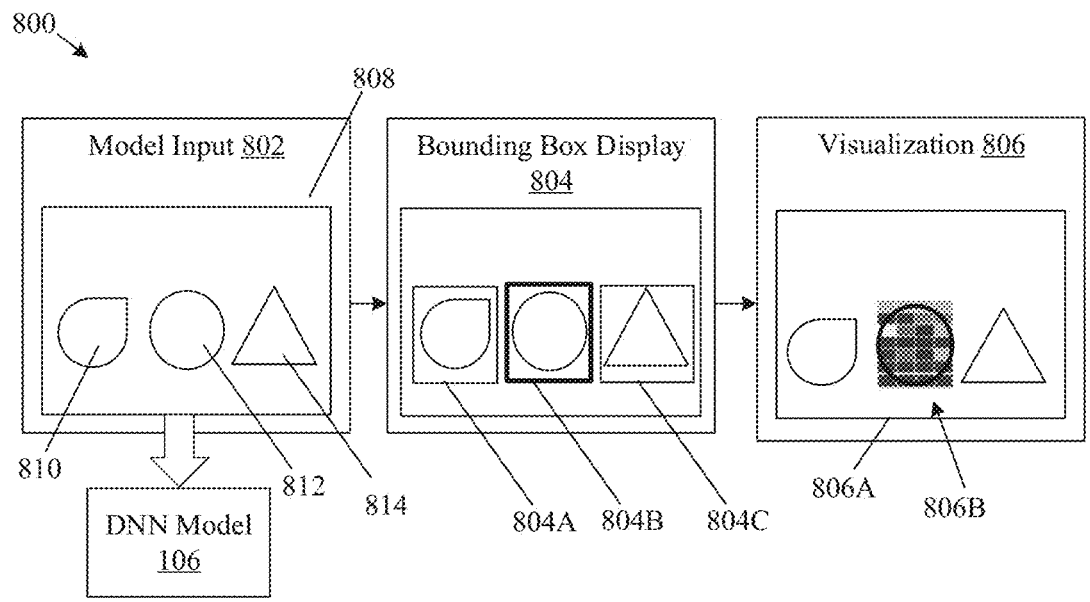
FIG. 8 is a diagram that illustrates exemplary operations for single object selection from among multiple object detections and for heatmap visualization based on such a selection, in accordance with an embodiment of the disclosure.

FIG. 8 is a diagram that illustrates exemplary operations for single object selection from among multiple object detections and for heatmap visualization based on such a selection, in accordance with an embodiment of the disclosure. FIG. 8 is explained in conjunction with elements from FIGS. 1, 2, 3A, 3B, 4, 5, 6, and 7. With reference to FIG. 8, there is shown a block diagram 800. In the block diagram 800, there is shown a sequence of operations from 802 to 806 on a first image frame 808 which may include a plurality of objects, such as a first object 810, a second object 812, and a third object 814.

At 802, the circuitry 202 may input the first image frame 808 to a DNN model (such as the DNN model 106) and may extract a plurality of object detection results associated with the plurality of objects, as outputs of the DNN model 106 for the input first image frame 808.

At 804, the circuitry 202 may control a display device (such as the display device 104) to display a plurality of bounding boxes (such as a bounding box 804A, a bounding box 804B, and a bounding box 804C) around the plurality of objects (such as the first object 810, the second object 812, and the third object 814) in the input first image frame 808. The plurality of bounding boxes may be displayed based on the extracted plurality of object detection results, as also described, for example, in FIG. 3A. The circuitry 202 may receive an input that may be indicative of a selection of a first bounding box (such as the bounding box 804B) from the displayed plurality of bounding boxes. Based on the received input, the circuitry 202 may select the object of interest (such as the second object 812) from the plurality of objects.

At 806, the circuitry 202 may generate the visualization frame 806A for the selected object of interest (such as the second object 812) based on execution of the set of operations from 306 to 322 of FIG. 3A and FIG. 3B. The visualization frame 806A may include a heatmap visualization of a region 806B which may include the selected object of interest (such as the second object 812), as described, for example, in FIG. 3B.

Figure 9:
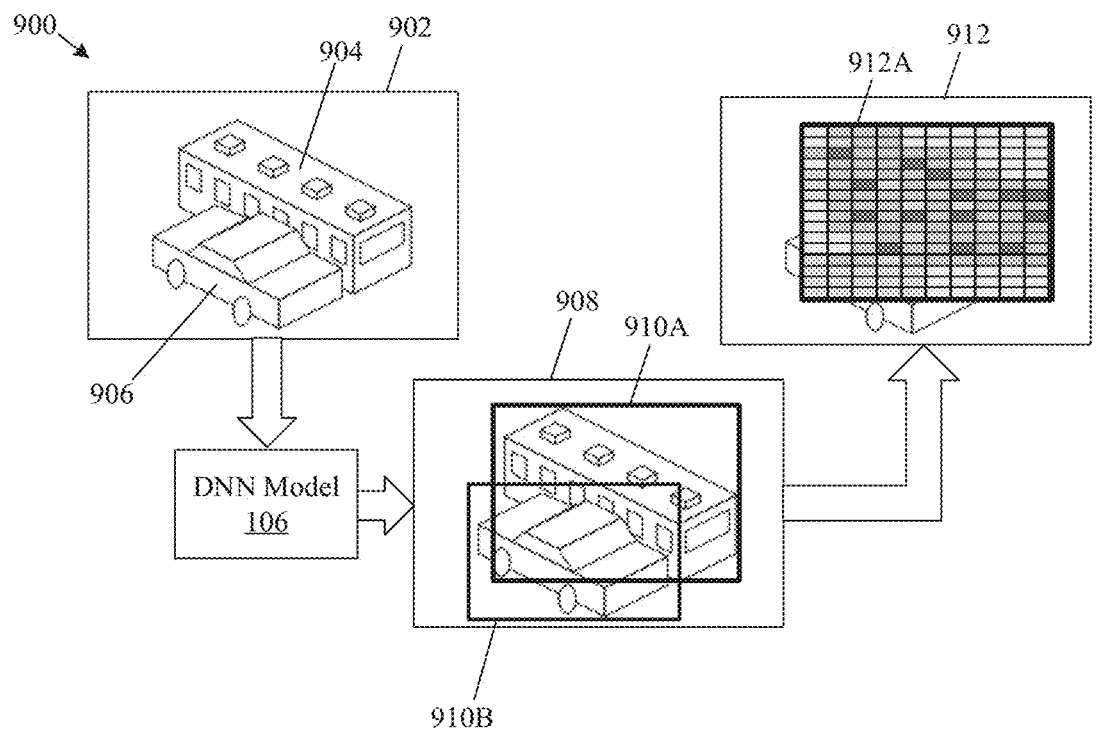
FIG. 9 is a diagram that illustrates an exemplary scenario for heatmap visualization of two partially overlapping objects in an image frame, in accordance with an embodiment of the disclosure.

FIG. 9 is a diagram that illustrates an exemplary scenario for heatmap visualization of two partially overlapping objects in an image frame, in accordance with an embodiment of the disclosure. FIG. 9 is explained in conjunction with elements from FIGS. 1, 2, 3A, 3B, 4, 5, 6, 7 and 8. With reference to FIG. 9, there is shown a first image frame 902 that may include a plurality of objects, such as a first object 904 and a second object 906. As shown, the first object 904 (i.e. a tram) is at least partially overlapped or occluded by the second object 906 (i.e. a car). When the first image frame 902 is passed as input to the DNN model 106, the DNN model 106 may output an object detection result for each of the first object 904 and the second object 906.

If there is no input from a user (such as the user 110), the circuitry 202 may select both the first object 904 and the second object 906 as two separate objects of interest. Alternatively, the circuitry 202 may consider the first object 904 and the second object 906 as a lumped object and may generate the visualization frame having the heatmap visualization of a region which includes the lumped object.

In at least one embodiment, the circuitry 202 may control a display device (such as the display device 104) to display an image 908 which shows a bounding box 910A around the first object 904 and a bounding box 910B around the second object 906. For the first object 904 and the second object 906, the respective bounding boxes (i.e. the bounding box 910A and the bounding box 910B) may be shown based on bounding box coordinates in respective object detection results, as also described, for example, in FIG. 3A. The circuitry 202 may receive an input that may be indicative of a selection of a bounding box around one of the first object 904 or the second object 906. Based on the received input, the circuitry 202 may select the object of interest as one which is surrounded by the selected bounding box. For the selected object of interest, operations from 306 to 322 may be executed to generate a visualization frame which include a heatmap visualization of a focus area or region which includes the selected object of interest. For example, if the first object 904 is selected, a visualization frame 912 may include the heatmap visualization of a focus area 912A or region which includes the first object 904.

It should be noted that the foregoing description may also be applicable to another scenario, where two or more objects at least partially overlap or occlude each other.

Figure 10:
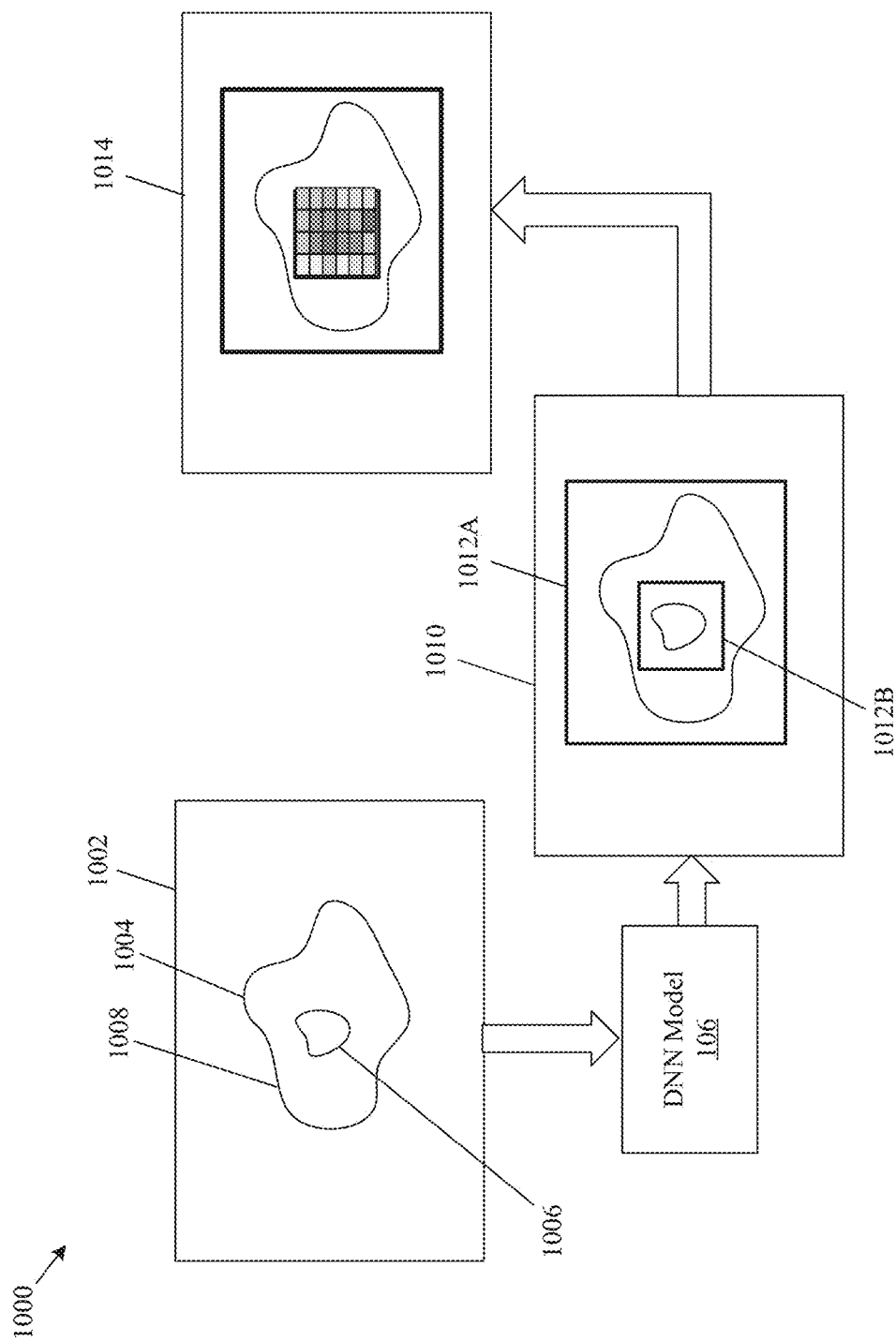
FIG. 10 is a diagram that illustrates an exemplary scenario for heatmap visualization of an object which lies within a region of another object in an image frame, in accordance with an embodiment of the disclosure.

FIG. 10 is a diagram that illustrates an exemplary scenario for heatmap visualization of an object which lies within a region of another object in an image frame, in accordance with an embodiment of the disclosure. FIG. 10 is explained in conjunction with elements from FIGS. 1, 2, 3A, 3B, 4, 5, 6, 7, 8 and 9. With reference to FIG. 10, there is shown a first image frame 1002 that includes a first object 1004 and a second object 1006 included within a boundary 1008 of the first object 1004. When the first image frame 1002 is passed as input to the DNN model 106, the DNN model 106 may output an object detection result for each of the first object 1004 and the second object 1006.

If there is no input from a user, the circuitry 202 may select both the first object 1004 and the second object 1006 as two separate objects of interest. Alternatively, the first object 1004 and the second object 1006 may be selected as a lumped object. The circuitry 202 may execute operations from 306 to 322 to generate a visualization frame including the heatmap visualization of a region which includes both the first object 1004 and the second object 1006.

In at least one embodiment, the circuitry 202 may control a display device (such as the display device 104) to display an image 1010 which shows a bounding box 1012A around the first object 1004 and a bounding box 1012B around the second object 1006. For each of the first object 1004 and the second object 1006, the respective bounding boxes (i.e. the bounding box 1012A and the bounding box 1012B) may be shown based on bounding box coordinates in respective object detection results, as also described, for example, in FIG. 3A. The circuitry 202 may receive an input that may be indicative of a selection of a bounding box around one of the first object 1004 or the second object 1006. Based on the received input, the circuitry 202 may select the object of interest as one which is surrounded by the selected bounding box. For the selected object of interest, operations from 306 to 322 may be executed to generate a visualization frame which may include a heatmap visualization of a focus area or region including the selected object of interest. For example, if the second object 1006 (i.e. a smaller object) is selected, a visualization frame 1014 may include the heatmap visualization of a focus area or region which includes the second object 1006.

Figure 11:
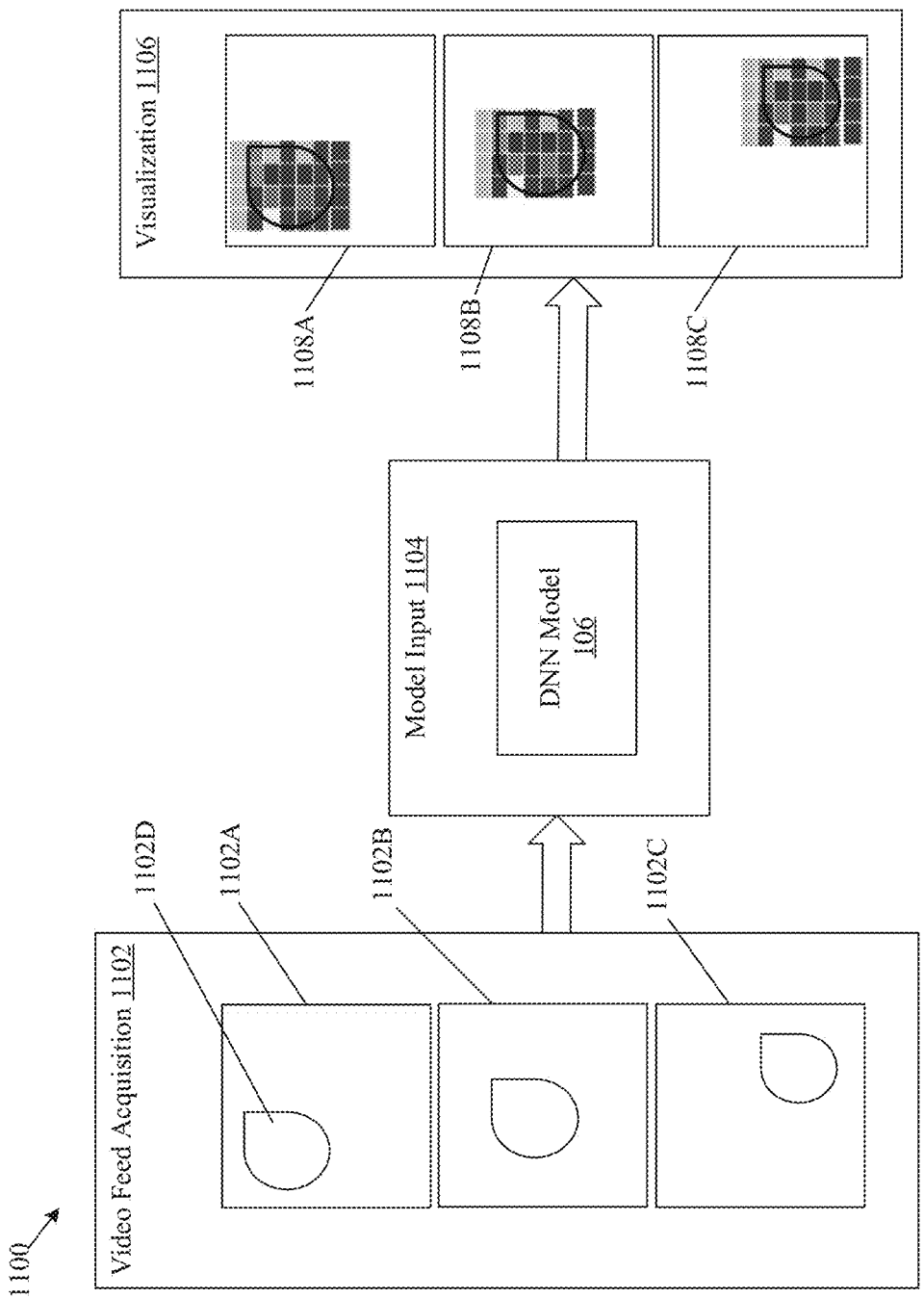
FIG. 11 is a diagram that illustrates exemplary operations for heatmap visualization of object(s) detected in a sequence of frames of a video feed, in accordance with an embodiment of the disclosure.

FIG. 11 is a diagram that illustrates exemplary operations for heatmap visualization of object(s) detected in a sequence of frames of a video feed, in accordance with an embodiment of the disclosure. FIG. 11 is explained in conjunction with elements from FIGS. 1, 2, 3A, 3B, 4, 5, 6, 7, 8, 9, and 10. With reference to FIG. 11, there is shown a block diagram 1100 that illustrates exemplary operations from 1102 to 1106, as described herein. The exemplary operations illustrated in the block diagram 1100 may start at 1102 and may be performed by any computing system, apparatus, or device, such as by the electronic apparatus 102 of FIG. 1 or FIG. 2. Although illustrated with discrete blocks, the exemplary operations associated with one or more blocks of the block diagram 1100 may be divided into additional blocks, combined into fewer blocks, or eliminated, depending on implementation of the exemplary operations.

At 1102, a video feed may be acquired. In an embodiment, the circuitry 202 may acquire a video feed and may extract, from the acquired video feed, a sequence of image frames (such as a frame 1102A, a frame 1102B, and a frame 1102C). If the first image frame 302A is part of the video feed, then the sequence of image frames may precede or succeed the first image frame 302A in the video feed. Each of the sequence of image frames may include an object of interest 1102D. In some embodiments, the sequence of image frames may capture a static scene with one or more static objects of interest or a dynamic scene with one or more moving objects of interest.

At 1104, the sequence of image frames may be fed sequentially (i.e. frame-by-frame) as input to the DNN model 106. In an embodiment, the circuitry 202 may input each of the sequence of image frames to the DNN model 106. The DNN model 106 may track the object of interest 1102D in the sequence of image frames and may output a sequence of object detection results associated with the tracked object of interest 1102D based on the input sequence of image frames.

In case the sequence of image frames includes the object of interest 1102D as the only object of interest, the circuitry 202 may extract the sequence of object detection results associated with the object of interest 1102D as an output of the DNN model 106 for the input sequence of image frames. In case the input sequence of image frames includes a plurality of objects, the circuitry 202 may extract a plurality of object detection results associated with the plurality of objects as the output of the DNN model 106 for each image frame of the input sequence of image frames. As each of the sequence of image frames is fed sequentially to the DNN model 106, operations for the extraction of the object detection result (or the plurality of object detection results) may be same as that for the first image frame 302A, as described at 302 and 304 of FIG. 3A.

While the object detection is performed frame-by-frame, the DNN model 106 may track and uniquely identify the object of interest 1102D throughout the sequence of image frames. In an embodiment, for each of the input sequence of image frames, the circuitry 202 may extract information such as bounding box coordinates, activation cell (cell-anchor), and feature vectors (as also described in FIGS. 3A and 3B). Such information may be stored in database. The circuitry 202 may determine a region of interest (ROI) in each of the input sequence of image frames based on such information. Thereafter, the determined ROI of a first image frame may be compared with that of a second image frame succeeding the first image frame in the input sequence of image frames. The above comparison may be iterated for all subsequent pairs of image frames and a tracking ID may be assigned to each ROI based on a similarity between compared ROIs. The object of interest 1102D may be tracked throughout the input sequence of image frames using the tracking ID.

For multi-object tracking, each object of interest may be identified a respective tracking ID determined based on respective bounding box coordinates and unique cell anchor values. The tracking ID may be associated with object's location and cell anchor values for differentiation. In some embodiments, other object tracking methods may be implemented separately or in conjunction with a tracking method which uses the tracking ID. Example of other object tracking methods may include, but are not limited to, Kalman filter-based tracking, particle filter-based tracking, kernel-based tracking, contour tracking, support vector machines and shape matching.

For heatmap visualization, the circuitry 202 may segment each of the sequence of image frames into a second plurality of image portions based on a corresponding object detection result of the sequence of object detection results. Details of segmentation are provided, for example, in FIG. 3A. Thereafter, operations from 308 to 316 may be performed for each of the sequence of image frames. The circuitry 202 may thereafter determine a plurality of weight values corresponding to the second plurality of image portions. The plurality of weight values (i.e. weight vector) may be determined for each image frame of the sequence of image frames. Each weight value may indicate a likelihood that a corresponding image portion of the second plurality of image portions belongs to the object of interest 1102D.

The circuitry 202 may generate a sequence of visualization frames (such as a frame 1108A, a frame 1108B, and a frame 1108C) based on the determined plurality of weight values for each of the sequence of image frames. Each visualization frame of the sequence of visualization frames may include a heatmap visualization of a region (or ROI) which includes the object of interest. Details of the generation of visualization frame are provided in FIG. 3B, for example. The sequence of visualization frames may succeed the visualization frame for the first image frame 302A, as described, for example, in FIG. 3B.

At 1106, the sequence of visualization frames may be displayed. In an embodiment, the circuitry 202 may control the display device 104 to display the generated sequence of visualization frames (such as the frame 1108A, the frame 1108B, and the frame 1108C). Each of the frame 1108A, the frame 1108B, and the frame 1108C may include the heatmap visualization of a region which includes the object of interest 1102D and is bounded by the respective bounding box coordinates.

In case of the DNN model 106 fails to detect the object of interest 1102D in an image frame, the visualization frame for such an image frame may be generated based on interpolation of adjacent visualization frames in the sequence of visualization frames. From the output sequence of object detection results, the circuitry 202 may determine a first object detection result which indicates that the object of interest 1102D is missing in an intermediate image frame of the input sequence of image frames. For example, the object of interest may be at least completely overlapped or occluded by a first object of the plurality of objects. In such a case, the circuitry 202 may select adjacent visualization frames from the generated sequence of visualization frames based on the determined first object detection result and may interpolate a first visualization frame for the intermediate image frame based on the selected adjacent visualization frames. The interpolation may be based on a suitable interpolation technique, such as, but not limited to, nearest neighbor interpolation, Bilinear interpolation, Bicubic interpolation, B-spline interpolation, Lanczos interpolation, and Discrete wavelet transform (DWT) interpolation. Thereafter, the circuitry 202 may insert the interpolated first visualization frame in the generated sequence of visualization frames.

Figure 12:
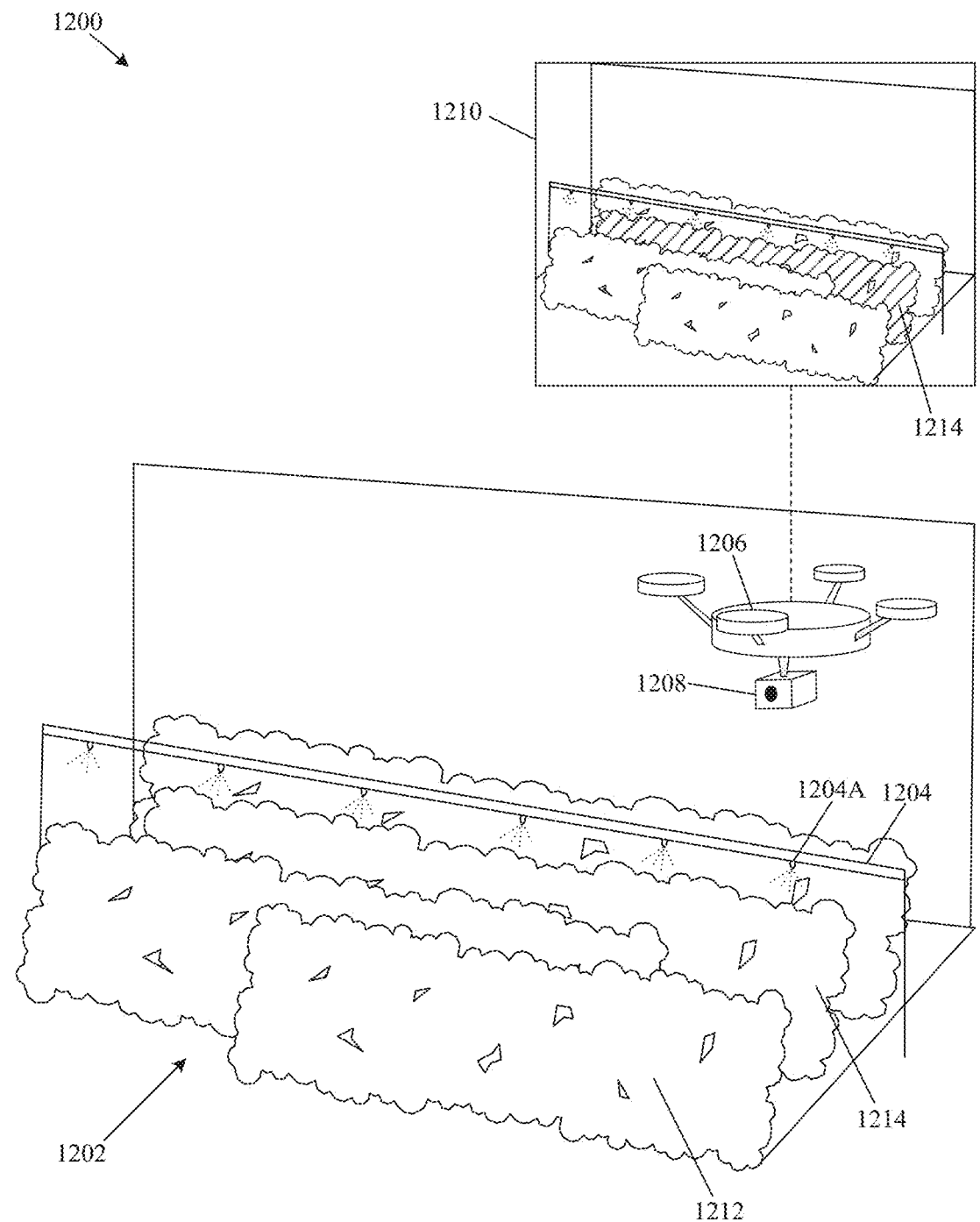
FIG. 12 is a diagram that illustrates an exemplary scenario for controlling an unmanned aerial vehicle for autonomous monitoring of agricultural farm, in accordance with an embodiment of the disclosure.

FIG. 12 is a diagram that illustrates an exemplary scenario for controlling an unmanned aerial vehicle for autonomous monitoring of agricultural farm, in accordance with an embodiment of the disclosure. FIG. 12 is explained in conjunction with elements from FIGS. 1, 2, 3A, 3B, 4, 5, 6, 7, 8, 9, 10, and 11. With reference to FIG. 12, there is shown an exemplary scenario 1200. The scenario 1200 may include an agricultural farm 1202, a pest control setup 1204, and an unmanned aerial vehicle 1206. The unmanned aerial vehicle 1206 may include an imaging device 1208, such as a camera mounted on or integrated with the unmanned aerial vehicle 1206. Herein, the unmanned aerial vehicle 1206 may be an exemplary implementation of the electronic apparatus 102 of FIG. 1.

While the unmanned aerial vehicle 1206 is flying, the unmanned aerial vehicle 1206 may control the image device 1208 to capture an input image frame 1210 of the agricultural farm 1202. The unmanned aerial vehicle 1206 may receive the input image frame 1210 that may include an object of interest, such as crops 1212 of the agricultural farm 1202. For the received input image frame 1210, the unmanned aerial vehicle 1206 may also receive a visualization frame which includes a heatmap visualization of a region which includes the crops in the input image frame 1210 of the agricultural farm 1202. In an embodiment, using a machine learning model, the unmanned aerial vehicle 1206 may extract a set of observations associated with the object of interest (i.e. the crops 1212) and determine an inference result associated with the object of interest (as described for example, in FIG. 4). For example, if the set of observations include numerical values indicative of crop health, then the inference result may determine an area of the agricultural farm which includes damaged crops 1214 (as shown). In another embodiment, the unmanned aerial vehicle 1206 may determine metrics (such as $F_{spread}$ or $F_{weight}$) associated with the visualization frame using the metrics calculation operation at 324 of FIG. 3B or FIG. 3C. Thereafter, the unmanned aerial vehicle 1206 may determine the inference result based on the determined metrics.

The unmanned aerial vehicle 1206 may receive an input corresponding to a user inquiry on the inference result to obtain a cause of the inference result on the damaged crops 1214 in the determined area. Based on the received input, the unmanned aerial vehicle 1206 may control a pest nozzle 1204A of the pest control setup 1204 to adjust a release of a pest spray on the damaged crops 1214.

Figure 13A:
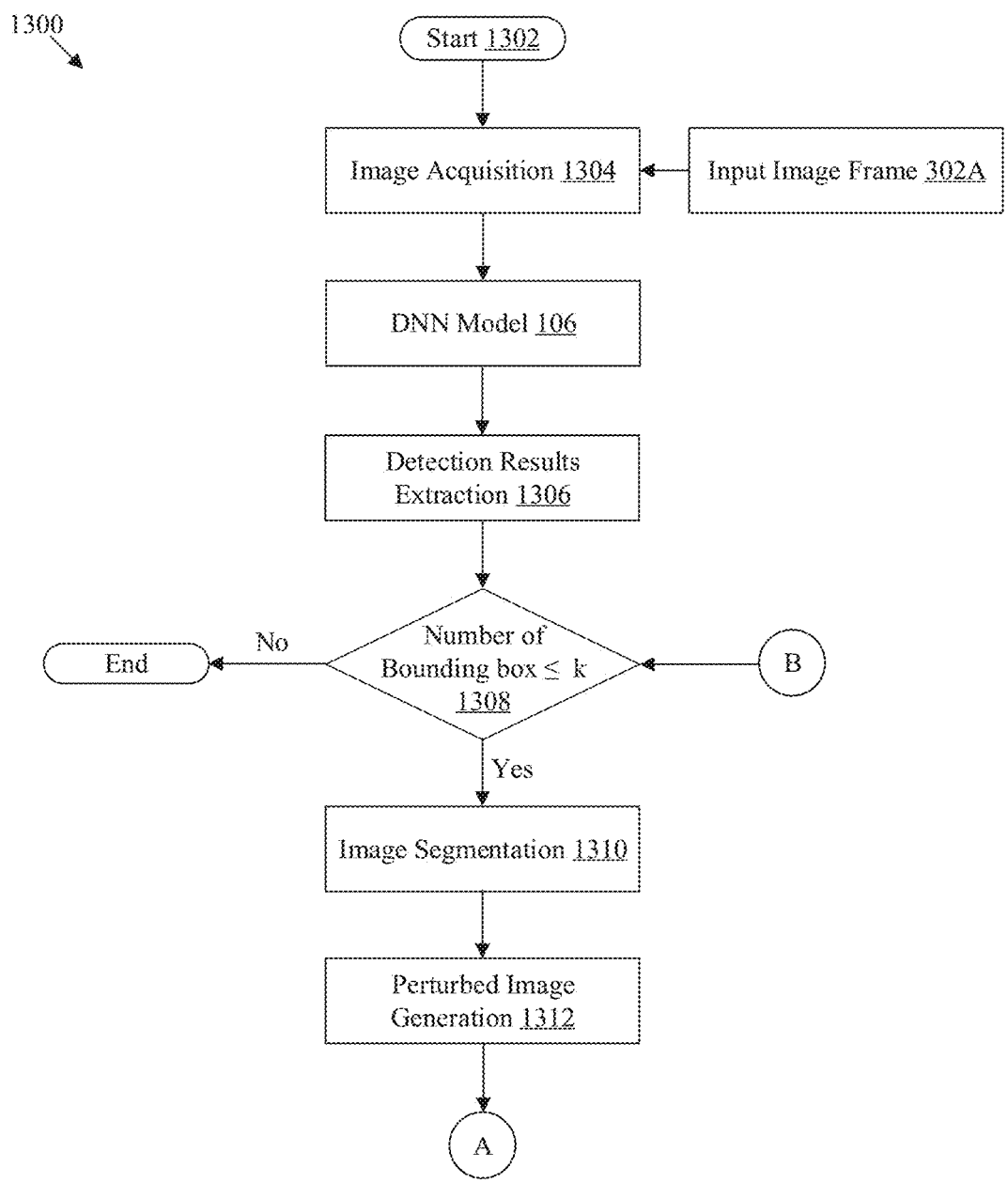
FIGS. 13A and 13B are diagrams that collectively illustrate exemplary operations for heatmap visualization of object detections, in accordance with an embodiment of the disclosure.
Figure 13B:
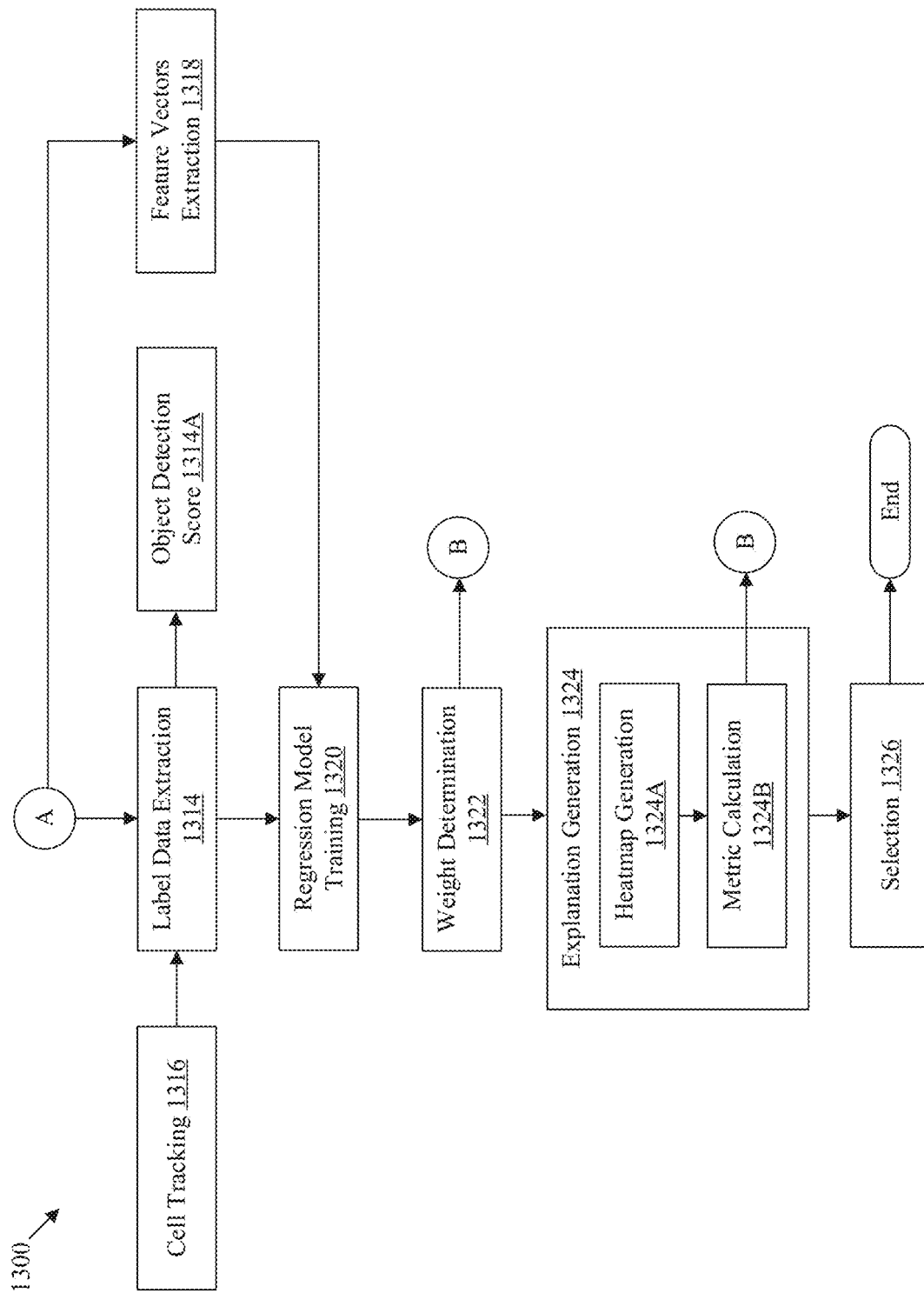

FIGS. 13A and 13B are diagrams that collectively illustrate exemplary operations for heatmap visualization of object detections, in accordance with an embodiment of the disclosure. FIGS. 13A and 13B are explained in conjunction with elements from FIGS. 1, 2, 3A, 3B, 4, 5, 6, 7, 8, 9, 10, 11, and 12. With reference to FIGS. 13A and 13B, there is shown a flowchart 1300 that illustrates exemplary operations from 1302 to 1326, as described herein. The exemplary operations illustrated in the flowchart 1300 may start at 1302 and may be performed by any computing system, apparatus, or device, such as by the electronic apparatus 102 of FIG. 1 or FIG. 2. Although illustrated with discrete blocks, the exemplary operations associated with one or more blocks of the flowchart 1300 may be divided into additional blocks, combined into fewer blocks, or eliminated, depending on implementation of the exemplary operations.

At 1304, the input first image frame 302A may be acquired. In an embodiment, the circuitry 202 may acquire the input first image frame 302A from a data source (such as a camera), based on execution of operations at 302 of FIG. 3A. For example, the input first image frame 302A may include a soccer-player as the object of interest.

At 1306, detection results may be extracted from the DNN model 106. In an embodiment, the circuitry 202 may extract an object detection result associated with the object of interest, as an output of the DNN model 106 for the input first image frame 302A, based on execution of operation at 304 of FIG. 3A. Along with the object detection result, the circuitry 202 may receive information, such as bounding box coordinates, confidence score, a resized image (i.e. a resized version of the input first image frame 302A), and a reference cell anchor.

At 1308, it may be determined whether a number of bounding boxes is less than or equal to a threshold value (k). In an embodiment, the circuitry 202 may be configured to determine whether the number of bounding boxes is less than or equal to the threshold value (k), based on the object detection result and the received information. The threshold value may be predefined or may be set through a user input (via the I/O device 206). In case the number of bounding boxes is less than or equal to the threshold value, control may pass to end. Otherwise, control may pass to 1310.

At 1310, image segmentation may be performed. In an embodiment, the circuitry 202 may segment the first image frame into a first plurality of image portions based on the bounding box coordinates, as described, for example, at 306 of FIG. 3A.

At 1312, perturbed images may be generated. In an embodiment, the circuitry 202 may generate a plurality of perturbed images based on the first plurality of image portion. Operation of the perturbed image generation is described, for example, at 308 of FIG. 3A.

At 1314, label data may be extracted. The label data may include a plurality of object detection scores 1314A corresponding to the generated plurality of perturbed images. For such extraction, a cell tracking operation at 1316 may be executed while the DNN model 106 is reapplied on the plurality of perturbed images to extract the label data from the DNN model 106. Details of such operation are provided, for example, at 310 of FIG. 3B.

At 1318, a plurality of feature vectors may be extracted. In an embodiment, the circuitry 202 may generate a first feature vector of a plurality of feature vectors for the first perturbed image of the plurality of perturbed images. Details of the extraction are provided, for example, at 314 of FIG. 3B.

At 1320, a regression model may be trained. In an embodiment, the circuitry 202 may train the regression model on the plurality of feature vectors (extracted at 1318) and the plurality of object detection scores (extracted as the label data at 1314). Details of the training are provided, for example, at 316 of FIG. 3B.

At 1322, weight values may be determined. In an embodiment, the circuitry 202 may determine a weight value for each image portion of the first plurality of image portions based on the trained regression model. Details of weight determination are provided, for example, at 318 of FIG. 3B.

At 1324, explanation generation may be performed. In an embodiment, the circuitry 202 may generate an explanation associated with the input first image frame 302A. The explanation generation may include a first operation of heatmap generation at 1324A and a second operation of metrics calculation at 1324B.

At 1324A, a visualization frame may be generated. In an embodiment, the circuitry 202 may generate a visualization frame based on the determined weight value for each image portion of the first plurality of image portions. The visualization frame may include the heatmap visualization of a region which is included in the input first image frame 302A and is bounded by the bounding box coordinates. Details of the generation of the visualization frame are provided, for example, at 322 of FIG. 3B.

At 1324B, metric calculation may be performed. In an embodiment, the circuitry 202 may determine (or calculate) visualization metrics, such as the first visual metric and the second visual metric based on the visualization frame (generated at 1320). Details of the metric calculation operation are provided, for example, at 324 of FIG. 3B or FIG. 3C. In an embodiment, the circuitry 202 may receive a user input which includes a selection of a visualization frame having lower values of the first visual metric or the second visual metric. In such a case, the circuitry 202 may generate an instruction to adjust at least one imaging parameter of an input source (such as a camera which initially acquired the multiple images). For example, if the selected visualization frame, having lower values of the first visual metric or the second visual metric is generated from an underexposed image frame, then the circuitry 202 may generate an instruction to adjust a sensor gain of the input source. In such a case, the input source may acquire a new image frame after adjustment of the at least one imaging parameter. Operations from 1304 to 1306 may be performed on the new image frame and control may pass to 1308.

At 1326, a selection may be performed. In an embodiment, the circuitry 202 may control the display device 104 to display the visualization frame and the computed metrics. Based a user input, the circuitry 202 may select an object (such as the soccer player of the input first image frame 302A) and may display the visualization frame on the display device 104. The visualization frame may include the heatmap visualization of the selected object. Further details of selection are provided, for example, at 412 of FIG. 4. Control may pass to end.

Figure 14:
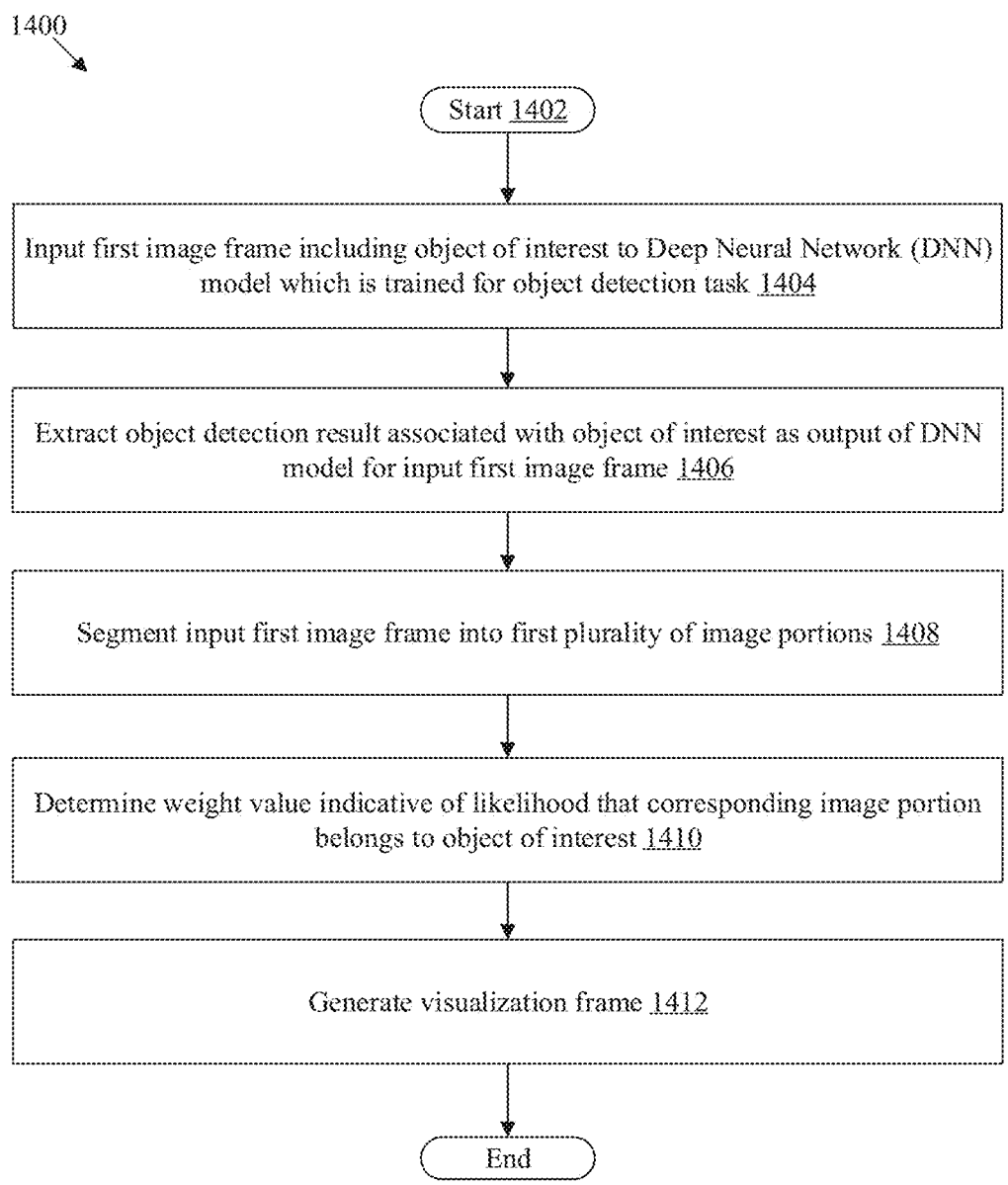
FIG. 14 is a flowchart that illustrates exemplary method for heatmap visualization of object detections, in accordance with an embodiment of the disclosure.

FIG. 14 is a flowchart that illustrates exemplary method for heatmap visualization of object detections, in accordance with an embodiment of the disclosure. FIG. 14 is explained in conjunction with elements from FIGS. 1, 2, 3A, 3B, 4, 5, 6, 7, 8, 9, 10, 11, 12, 13A and 13B. With reference to FIG. 14, there is shown a flowchart 1400. The method illustrated in the flowchart 1400 may be executed by any computing system, such as by the electronic apparatus 102 or the circuitry 202. The method may start at 1402 and proceed to 1404.

At 1404, a first image frame (such as the first image frame 302A) may be input to the DNN model 106. In one or more embodiments, the circuitry 202 may be configured to input the first image frame 302A (which includes the object of interest 302B) to the DNN model 106. The DNN model 106 may be trained for an object detection task.

At 1406, an object detection result may be extracted from the DNN model 106. In one or more embodiments, the circuitry 202 may be configured to extract the object detection result associated with the object of interest 302B as an output of the DNN model 106 for the input first image frame 302A. The extracted object detection result may include bounding box coordinates (such as the bounding box coordinates 304B) for the object of interest 302B.

At 1408, the input first image frame 302A may be segmented. In one or more embodiments, the circuitry 202 may be configured to segment the input first image frame 302A into a first plurality of image portions 306A . . . 306N based on the bounding box coordinates 304B.

At 1410, a weight value may be determined for each image portion of the first plurality of image portions. The weight value may be indicative of a likelihood that a corresponding image portion belongs to the object of interest 302B. In one or more embodiments, the circuitry 202 may be configured to determine the weight value for each image portion of the first plurality of image portions 306A . . . 306N.

At 1412, the visualization frame 322A may be generated. The visualization frame 322A may include a heatmap visualization of a region which is included in the input first image frame 302A and is bounded by the bounding box coordinates 304B. In one or more embodiments, the circuitry 202 may be configured to generate the visualization frame 322A based on the determined weight value for each image portion of the first plurality of image portions 306A. Control may pass to end.

Although the flowchart 1400 is illustrated as discrete operations, such as 1402, 1404, 1406, 1408, 1410, and 1412, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic apparatus. The computer-executable instructions may cause the machine and/or computer to perform operations that include inputting a first image frame that may include an object of interest to a Deep Neural Network (DNN) model which is trained for an object detection task. The operations may further include extracting an object detection result associated with the object of interest as an output of the DNN model for the input first image frame. The extracted object detection result may include bounding box coordinates for the object of interest. The operations may further include segmenting the input first image frame into a first plurality of image portions based on the bounding box coordinates and determining, for each image portion of the first plurality of image portions, a weight value indicative of a likelihood that a corresponding image portion belongs to the object of interest. The operations may further include generating, based on the determined weight for each image portion of the first plurality of image portions, a visualization frame that may include a heatmap visualization of a region which is included in the input first image frame and is bounded by the bounding box coordinates.

Exemplary aspects of the disclosure may provide an electronic apparatus (such as the electronic apparatus 102 of FIG. 1) that includes circuitry (such as the circuitry 202). The circuitry may be configured to input a first image frame (such as the first image frame 302A) that may include an object of interest (such as the object of interest 302B) to a Deep Neural Network (DNN) model (such as the DNN model 106) which is trained for an object detection task. The circuitry may be configured to extract an object detection result associated with the object of interest from an output of the DNN model for the input first image frame. In accordance with an embodiment, the extracted object detection result may include bounding box coordinates (such as, the bounding box coordinates 304B) for the object of interest. The circuitry may be configured to segment the input first image frame into a first plurality of image portions (such as the first plurality of image portions 306A ... 306N) based on the bounding box coordinates. For each image portion of the first plurality of image portions, the circuitry may be configured to determine a weight value indicative of a likelihood that a corresponding image portion belongs to the object of interest. Based on the determined weight value for each image portion of the first plurality of image portions, the circuitry may be further configured to generate a visualization frame (such as the visualization frame 322A) comprising a heatmap visualization of a region which is included in the input first image frame and is bounded by the bounding box coordinates.

In accordance with an embodiment, the input first image frame may include a plurality of objects (such as the first object 410, the second object 412, and the third object 414). The circuitry may be configured to extract a plurality of object detection results associated with the plurality of objects from the output of the DNN model for the input first image frame. In some embodiments, the object of interest may be at least partially overlapped or occluded by a first object of the plurality of objects. In some embodiments, the object of interest may at least partially overlap or occlude a first object of the plurality of objects. Based on the extracted plurality of object detection results, the circuitry may be configured to control a display device (such as the display device 104) to display a plurality of bounding boxes around the plurality of objects in the input first image frame. The circuitry may be configured to receive an input that may include a selection of a first bounding box from the displayed plurality of bounding boxes. The circuitry may be further configured to select the object of interest from the plurality of objects based on received input and generate the visualization frame further based on the selection.

In accordance with an embodiment, the circuitry may be further configured to execute a random sample selection of a first set of image portions from the first plurality of image portions. The circuitry may be further configured to apply a mask on a portion of the input first image frame which may include the first set of image portions and generate a first perturbed image (such as the first perturbed image 308A) of a plurality of perturbed images (such as the plurality of perturbed images 308A ... 308N) based on the application of the mask.

In accordance with an embodiment, the circuitry may be further configured to determine, from a plurality of activation cells of the DNN model, a first activation cell which may be responsible for the object detection result in the output of the DNN model. The circuitry may be configured to input the first perturbed image of the plurality of perturbed images to the DNN model. From a first output of the determined first activation cell of the DNN model for the input first perturbed image, the circuitry may be configured to extract a first object detection score of a plurality of object detection scores which may correspond to the plurality of perturbed images.

In accordance with an embodiment, the circuitry may be further configured to generate, for the first perturbed image of the plurality of perturbed images, a first feature vector of a plurality of feature vectors. The generated first feature vector may include a plurality of vector elements corresponding to the first plurality of image portions of the input first image frame, and each vector element of the plurality of vector elements may stores a value which may indicates whether the corresponding image portion of the first plurality of image portions is masked in the first perturbed image.

In accordance with an embodiment, circuitry may be further configured to train a regression model on the plurality of feature vectors and the plurality of object detection scores (such as the plurality of object detection scores 310A). The weight value for each image portion of the first plurality of image portions may be determined based on the trained regression model.

In accordance with an embodiment, the circuitry may be further configured to select, from a heatmap color palette, a color value which may be representative of the determined weight value. The color value may be selected based on a heatmap color scheme for a range of weight values. Based on the selected color value for each image portion of the first plurality of image portions, the circuitry may be configured to generate the visualization frame including the heatmap visualization of the region bounded by the bounding box coordinates.

In accordance with an embodiment, the circuitry may be further configured to select the bounding box around the object of interest in the input first image frame. The selected bounding box may be determined by the bounding box coordinates in the object detection result of the DNN model. The circuitry may be configured to determine a first count of weight values which may be greater than zero inside the selected bounding box based on the determined weight value for each image portion of the first plurality of image portions and determine a second count of weight values which may be equal to zero inside the bounding box based on the determined weight value for each image portion of the first plurality of image portions. The circuitry may be configured to compute a first visual metric as a ratio of the determined first count to a sum of the determined first count and the determined second count.

In accordance with an embodiment, the circuitry may be further configured to select a bounding box around the object of interest in the input first image frame. The circuitry may be configured to determine a first sum of a first set of weight values which may be greater than zero inside the selected bounding box. The circuitry may be further configured to determine a second sum of a second set of weight values which may be greater than zero outside the selected bounding box. Each of the first sum and the second sum may be determined based on the determined weight values for the first plurality of image portions. Thereafter, the circuitry may be configured to determine a second visual metric as a ratio of the determined first sum to a sum of the determined first sum and the determined second sum.

In accordance with an embodiment, the circuitry may be configured to receive an input comprising a selection of the object of interest from the visualization frame. Based on the received input the circuitry may be configured to select the object of interest from the visualization frame. The circuitry may be configured to extract a set of observations associated with the selected object of interest. The circuitry may be further configured to determine an inference result (such as the inference result 504) associated with the selected object of interest based on the extracted set of observations. The determined inference result comprising numerical values for a visual attribute or a state of the selected object of interest.

In accordance with an embodiment, the circuitry may be configured to: generate an explanation (such as, the explanation 506) based on the determined inference result. The generated explanation comprising a natural language description of the determined inference result. The circuitry may be further configured to control a display device to display the generated explanation.

In accordance with an embodiment, the circuitry may be configured to: determine a plurality of recommendations associated with the generated explanation based on the determined inference result. The circuitry may be configured to control the display device to display the generated plurality of recommendations associated with the determined explanation. The circuitry may be configured to receive an input comprising a selection of a first recommendation from the plurality of recommendations. Based on the received input, the circuitry may be configured to select the first recommendation from the plurality of recommendations. The circuitry may be further configured to adjust image parameters associated with the input first image frame based on the selected first recommendation.

In accordance with an embodiment, the circuitry is further configured to extract, from a video feed, a sequence of image frames (such as the frame 702A, the frame 702B, and the frame 702C) which may succeed the first image frame in the video feed and includes the object of interest. The circuitry may be further configured to input the sequence of image frames to the DNN model. The DNN model may be configured to track the object of interest in the sequence of image frames and output a sequence of object detection results associated with the tracked object of interest based on the input sequence of image frames.

In accordance with an embodiment, the circuitry may be further configured to segment each of the sequence of image frames into a second plurality of image portions based on a corresponding object detection result of the sequence of object detection results. The circuitry may be configured to determine a plurality of weight values corresponding to the second plurality of image portions of each image frame of the sequence of image frames. In accordance with an embodiment, each weight value of the plurality of weight values may be indicative of a likelihood that a corresponding image portion of the second plurality of image portions belongs to the object of interest. The circuitry may be configured to generate, based on the determined plurality of weight values for each of the sequence of image frames, a sequence of visualization frames (such as the frame 1108A, the frame 1108B, and the frame 1108C) which may succeed the visualization frame for the input first image frame.

In accordance with an embodiment, the circuitry may be further configured to determine, from the output sequence of object detection results, a first object detection result which may indicate that the object of interest is missing in an intermediate image frame of the input sequence of image frames. The circuitry may be configured to select adjacent visualization frames from the generated sequence of visualization frames based on the determination and interpolate a first visualization frame for the intermediate image frame based on the selected adjacent visualization frames.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
   circuitry configured to:
   input a first image frame comprising an object of interest to a Deep Neural Network (DNN) model, wherein the DNN model is trained for an object detection task;
   extract an object detection result associated with the object of interest from an output of the DNN model for the input first image frame,
   wherein the extracted object detection result comprises bounding box coordinates for the object of interest;
   segment the input first image frame into a first plurality of image portions based on the bounding box coordinates;
   determine, for each image portion of the first plurality of image portions, a weight value indicative of a likelihood that a corresponding image portion belongs to the object of interest;
   generate, based on the determined weight value for each image portion of the first plurality of image portions, a visualization frame comprising a heatmap visualization of a region of the input first image frame, wherein the region of the input first image frame is bounded by the bounding box coordinates;
   select a bounding box around the object of interest in the input first image frame, wherein the selected bounding box corresponds to the bounding box coordinates in the object detection result of the DNN model;
   determine a first count of weight values which are greater than zero inside the selected bounding box, wherein the determination of the first count is based on the determined weight value for each image portion of the first plurality of image portions;
   determine a second count of weight values which equal zero inside the selected bounding box, wherein the determination of the second count is based on the determined weight value for each image portion of the first plurality of image portions; and
   compute a first visual metric as a ratio of the determined first count to a sum of the determined first count and the determined second count.

2. The electronic apparatus according to claim 1, wherein the input first image frame comprises a plurality of objects.

3. The electronic apparatus according to claim 2, wherein the circuitry is further configured to:
- extract a plurality of object detection results associated with the plurality of objects from the output of the DNN model for the input first image frame;
- control a display device to display, based on the extracted plurality of object detection results, a plurality of bounding boxes around the plurality of objects in the input first image frame;
- receive a selection of a first bounding box from the displayed plurality of bounding boxes;
- select the object of interest from the plurality of objects based on the selection of the first bounding box; and
- generate the visualization frame further based on the selection of the object of interest.

4. The electronic apparatus according to claim 3, wherein the object of interest is at least partially overlapped or occluded by a first object of the plurality of objects.

5. The electronic apparatus according to claim 3, wherein the object of interest at least partially overlaps or occludes a first object of the plurality of objects.

6. The electronic apparatus according to claim 1, wherein the circuitry is further configured to:
- execute a random sample selection of a first set of image portions from the first plurality of image portions;
- apply a mask on a portion of the input first image frame which comprises the first set of image portions; and
- generate a first perturbed image of a plurality of perturbed images based on the application of the mask.

7. The electronic apparatus according to claim 6, wherein the circuitry is further configured to select a window size based on an input dimension of the input first image frame and the bounding box coordinates, and the input first image frame is segmented into the first plurality of image portions based on the selected window size.

8. The electronic apparatus according to claim 6, wherein the circuitry is further configured to:
- determine, from a plurality of activation cells of the DNN model, a first activation cell that corresponds to the object detection result in the output of the DNN model;
- input the first perturbed image of the plurality of perturbed images to the DNN model; and
- extract, from a first output of the determined first activation cell of the DNN model for the input first perturbed image, a first object detection score of a plurality of object detection scores of the plurality of perturbed images.

9. The electronic apparatus according to claim 8, wherein the circuitry is further configured to generate, for the first perturbed image of the plurality of perturbed images, a first feature vector of a plurality of feature vectors,
the generated first feature vector comprises a plurality of vector elements corresponding to the first plurality of image portions of the input first image frame, and
each vector element of the plurality of vector elements stores a value which indicates whether the corresponding image portion of the first plurality of image portions is masked in the first perturbed image.

10. The electronic apparatus according to claim 9, wherein the circuitry is further configured to:
- train a regression model on the plurality of feature vectors and the plurality of object detection scores; and
- determine the weight value for each image portion of the first plurality of image portions based on the trained regression model.

11. The electronic apparatus according to claim 1, wherein the circuitry is further configured to:
- select, from a heatmap color palette, a color value which is representative of the determined weight value, wherein the color value is selected based on a heatmap color scheme for a range of weight values; and
- generate, based on the selected color value for each image portion of the first plurality of image portions, the visualization frame comprising the heatmap visualization of the region bounded by the bounding box coordinates.

12. The electronic apparatus according to claim 1, wherein the circuitry is further configured to:
- determine a first sum of the weight values which are greater than zero inside the selected bounding box;
- determine a second sum of weight values which are greater than zero outside the selected bounding box, wherein each of the first sum and the second sum is determined based on the determined weight value for each image portion of the first plurality of image portions; and
- compute a second visual metric as a ratio of the determined first sum to a sum of the determined first sum and the determined second sum.

13. The electronic apparatus according to claim 1, wherein the circuitry is further configured to:
- receive a selection of the object of interest from the visualization frame;
- select the object of interest from the visualization frame based on received input;
- extract a set of observations associated with the selected object of interest; and
- determine an inference result associated with the selected object of interest based on the extracted set of observations, wherein the determined inference result comprises numerical values for at least one of a visual attribute or a state of the selected object of interest.

14. The electronic apparatus according to claim 13, wherein the circuitry is further configured to:
- generate an explanation based on the determined inference result, wherein the generated explanation comprises a natural language description of the determined inference result; and
- control a display device to display the generated explanation.

15. The electronic apparatus according to claim 14, wherein the circuitry is further configured to:
- determine a plurality of recommendations associated with the generated explanation based on the determined inference result;
- control the display device to display the determined plurality of recommendations associated with the generated explanation;
- receive a selection of a first recommendation of the displayed plurality of recommendations;
- select the first recommendation based on the received selection of the first recommendation; and
- adjust image parameters associated with the input first image frame based on the selected first recommendation.

16. The electronic apparatus according to claim 1, wherein the circuitry is further configured to:
- extract, from a video feed, a sequence of image frames which succeeds the first image frame in the video feed and includes the object of interest; and input the sequence of image frames to the DNN model, wherein the DNN mode:
    tracks the object of interest in the sequence of image frames; and
    outputs a sequence of object detection results associated with the tracked object of interest based on the input sequence of image frames.

17. The electronic apparatus according to claim 16, wherein the circuitry is further configured to:
    segment each image frame of the sequence of image frames into a second plurality of image portions based on a corresponding object detection result of the sequence of object detection results;
    determine a plurality of weight values corresponding to the second plurality of image portions of each image frame of the sequence of image frames,
        wherein each weight value of the plurality of weight values is indicative of a likelihood that a corresponding image portion of the second plurality of image portions belongs to the object of interest; and
    generate, based on the determined plurality of weight values for each of the sequence of image frames, a sequence of visualization frames which succeeds the visualization frame for the input first image frame.

18. The electronic apparatus according to claim 17, wherein the circuitry is further configured to:
    determine, from the output sequence of object detection results, a first object detection result which indicates that the object of interest is missing in an intermediate image frame of the input sequence of image frames;
    select adjacent visualization frames from the generated sequence of visualization frames based on the determination of the first object detection result; and
    interpolate a first visualization frame for the intermediate image frame based on the selected adjacent visualization frames.

19. A method, comprising:
    inputting an image frame comprising an object of interest to a Deep Neural Network (DNN) model, wherein the DNN model is trained for an object detection task;
    extracting an object detection result associated with the object of interest from an output of the DNN model for the input image frame,
        wherein the extracted object detection result comprises bounding box coordinates for the object of interest;
    segmenting the input image frame into a plurality of image portions based on the bounding box coordinates;
    determining, for each image portion of the plurality of image portions, a weight value indicative of a likelihood that a corresponding image portion belongs to the object of interest; and
    generating, based on the determined weight value for each image portion of the plurality of image portions, a visualization frame comprising a heatmap visualization of a region of the input image frame, wherein the region of the input image frame is bounded by the bounding box coordinates;
    selecting a bounding box around the object of interest in the input first image frame, wherein the selected bounding box corresponds to the bounding box coordinates in the object detection result of the DNN model;
    determining a first count of weight values which are greater than zero inside the selected bounding box, wherein the determination of the first count is based on the determined weight value for each image portion of the plurality of image portions;
    determining a second count of weight values which equal zero inside the selected bounding box, wherein the determination of the second count is based on the determined weight value for each image portion of the plurality of image portions; and
    computing a first visual metric as a ratio of the determined first count to a sum of the determined first count and the determined second count.

20. A non-transitory computer-readable medium having stored thereon, computer-executable instructions which, when executed an electronic apparatus, causes the electronic apparatus to execute operations, the operations comprising:
    inputting an image frame comprising an object of interest to a Deep Neural Network (DNN) model, wherein the DNN model is trained for an object detection task;
    extracting an object detection result associated with the object of interest from an output of the DNN model for the input image frame,
        wherein the extracted object detection result comprises bounding box coordinates for the object of interest;
    segmenting the input image frame into a plurality of image portions based on the bounding box coordinates;
    determining, for each image portion of the plurality of image portions, a weight value indicative of a likelihood that a corresponding image portion belongs to the object of interest; and
    generating, based on the determined weight value for each image portion of the plurality of image portions, a visualization frame comprising a heatmap visualization of a region of the input image frame, wherein the region of the input image frame is bounded by the bounding box coordinates;
    selecting a bounding box around the object of interest in the input first image frame, wherein the selected bounding box corresponds to the bounding box coordinates in the object detection result of the DNN model;
    determining a first count of weight values which are greater than zero inside the selected bounding box, wherein the determination of the first count is based on the determined weight value for each image portion of the plurality of image portions;
    determining a second count of weight values which equal zero inside the selected bounding box, wherein the determination of the second count is based on the determined weight value for each image portion of the plurality of image portions; and
    computing a first visual metric as a ratio of the determined first count to a sum of the determined first count and the determined second count.

21. An electronic apparatus, comprising:
    circuitry configured to:
        input an image frame comprising an object of interest to a Deep Neural Network (DNN) model, wherein the DNN model is trained for an object detection task;
        extract an object detection result associated with the object of interest from an output of the DNN model for the input image frame,
            wherein the extracted object detection result comprises bounding box coordinates for the object of interest;
        segment the input image frame into a plurality of image portions based on the bounding box coordinates;
        determine, for each image portion of the plurality of image portions, a weight value indicative of a likelihood that a corresponding image portion belongs to the object of interest;

generate, based on the determined weight value for each image portion of the plurality of image portions, a visualization frame comprising a heatmap visualization of a region of the input image frame, wherein the region of the input image frame is bounded by the bounding box coordinates;

select, based on the generation of the visualization frame, a bounding box around the object of interest in the input first image frame, wherein the selected bounding box corresponds to the bounding box coordinates in the object detection result of the DNN model;

determine a first sum of a first set of weight values which is greater than zero inside the selected bounding box;

determine a second sum of a second set of weight values which is greater than zero outside the selected bounding box, wherein each of the first sum and the second sum is determined based on the determined weight value for each image portion of the plurality of image portions; and compute a second visual metric as a ratio of the determined first sum to a sum of the determined first sum and the determined second sum.

* * * * *